(12) United States Patent
Maltaverne et al.

(10) Patent No.: US 8,769,872 B2
(45) Date of Patent: Jul. 8, 2014

(54) DEVICE FOR CLOSING OFF AN OPENING MADE IN A STRUCTURAL ELEMENT COMPRISING SYNCHRONIZATION, AND CORRESPONDING AUTOMOBILE

(75) Inventors: Guy Maltaverne, Bressuire (FR); Serge Gerbeau, Saint-Sauveur (FR); Frederic Giret, Bressuire (FR); Mickael Desbois, Parthenay (FR)

(73) Assignee: Advanced Comfort Systems France SAS-ACS France (FR)

( * ) Notice: Subject to any disclaimer, the term of this patent is extended or adjusted under 35 U.S.C. 154(b) by 79 days.

(21) Appl. No.: 13/379,189

(22) PCT Filed: Jun. 21, 2010

(86) PCT No.: PCT/EP2010/058752
§ 371 (c)(1),
(2), (4) Date: Mar. 12, 2012

(87) PCT Pub. No.: WO2010/146185
PCT Pub. Date: Dec. 23, 2010

(65) Prior Publication Data
US 2012/0167469 A1 Jul. 5, 2012

(30) Foreign Application Priority Data

Jun. 19, 2009 (EP) ..................................... 09163306
Sep. 11, 2009 (EP) ..................................... 09170132
Oct. 16, 2009 (EP) ..................................... 09173357
Jan. 21, 2010 (EP) ..................................... 10151348

(51) Int. Cl.
*E05F 11/53* (2006.01)

(52) U.S. Cl.
USPC ............................................. 49/209; 49/210

(58) Field of Classification Search
USPC ........................... 49/209–211, 213, 325, 380
See application file for complete search history.

(56) References Cited

U.S. PATENT DOCUMENTS 4,995,195 A * 2/1991 Olberding et al. ............... 49/118
5,542,214 A * 8/1996 Buening .......................... 49/380
(Continued)

FOREIGN PATENT DOCUMENTS

CA 2535229 6/2007
EP 0778168 6/1997
(Continued)

OTHER PUBLICATIONS

PCT International Search Report for PCT/EP2010/058752, corresponding to U.S. Appl. No. 13/379,189 mailed Dec. 30, 2010, 3 pages.
(Continued)

*Primary Examiner* — Katherine Mitchell
*Assistant Examiner* — Justin Rephann
(74) *Attorney, Agent, or Firm* — Pauly, DeVries Smith & Deffner, LLC

(57) ABSTRACT

A device is provided for sealing an opening made in a structure, including a fixed panel in which an opening is defined, and at least one sliding panel, including: two shuttles respectively guided in two guiding rails mounted and/or formed on the surface of the fixed panel facing the inside of the vehicle and a frame supporting at least two guiding pins respectively engaging with each one of the shuttles. The shuttles include guides for guiding the pins, enabling a transverse movement of the frame relative to the shuttles. An actuator acts directly or indirectly on the shuttles in order to move the latter in the rails, causing the sliding panel to move in a direction perpendicular to the plane of the fixed panel. The device also synchronizes the actuator so as to synchronize the movement of the shuttles.

18 Claims, 18 Drawing Sheets

(56) References Cited

U.S. PATENT DOCUMENTS

| | | | |
|---|---|---|---|
| 5,613,323 A | | 3/1997 | Buening |
| 5,724,769 A | | 3/1998 | Cripe et al. |
| 5,822,922 A | * | 10/1998 | Grumm et al. ............... 49/360 |
| 5,832,668 A | * | 11/1998 | Faubert et al. ............... 49/215 |
| 5,836,110 A | * | 11/1998 | Buening ....................... 49/360 |
| 6,119,401 A | * | 9/2000 | Lin et al. ..................... 49/361 |
| 6,125,585 A | * | 10/2000 | Koneval et al. ............... 49/349 |
| 6,324,788 B1 | * | 12/2001 | Koneval et al. ............... 49/121 |
| 6,810,622 B2 | * | 11/2004 | Oberheide ..................... 49/362 |
| 7,437,852 B2 | * | 10/2008 | Dufour et al. ................. 49/213 |
| 7,464,501 B2 | * | 12/2008 | Arimoto et al. ............... 49/413 |
| 7,509,773 B2 | * | 3/2009 | Vornbaumen et al. .......... 49/362 |
| 7,568,312 B2 | * | 8/2009 | Dufour et al. ................. 49/413 |
| 7,584,574 B2 | * | 9/2009 | Kinross et al. ................ 49/413 |
| 7,641,265 B2 | * | 1/2010 | Seiple et al. ............... 296/190.1 |
| 7,765,738 B2 | * | 8/2010 | Dufour et al. ................. 49/213 |
| 7,896,425 B2 | * | 3/2011 | Elliott et al. ............. 296/146.12 |
| 8,469,437 B2 | * | 6/2013 | Zanetti et al. ............ 296/146.16 |
| 2002/0148163 A1 | * | 10/2002 | Warner et al. ................. 49/209 |
| 2004/0144034 A1 | | 7/2004 | Bourque et al. |
| 2005/0044797 A1 | * | 3/2005 | Daniel et al. .................. 49/413 |
| 2006/0260205 A1 | * | 11/2006 | Dufour et al. ................. 49/413 |
| 2007/0277442 A1 | * | 12/2007 | Dery et al. .................... 49/362 |
| 2007/0277443 A1 | * | 12/2007 | Dery et al. .................... 49/413 |
| 2009/0019780 A1 | | 1/2009 | Hansel et al. |
| 2009/0025296 A1 | * | 1/2009 | Petner .......................... 49/130 |
| 2009/0107052 A1 | * | 4/2009 | Dufour et al. ................. 49/413 |
| 2009/0217595 A1 | * | 9/2009 | Grimm et al. ................. 49/413 |
| 2010/0263290 A1 | * | 10/2010 | Pawloski et al. ............... 49/413 |
| 2010/0269412 A1 | * | 10/2010 | Mellary et al. ................. 49/130 |
| 2011/0006558 A1 | | 1/2011 | Giret et al. |
| 2012/0091113 A1 | * | 4/2012 | Bennett et al. ................ 219/203 |
| 2012/0091114 A1 | * | 4/2012 | Ackerman et al. ........... 219/203 |
| 2012/0117880 A1 | * | 5/2012 | Lahnala et al. ................. 49/70 |

FOREIGN PATENT DOCUMENTS

| | | |
|---|---|---|
| EP | 0857844 | 8/1998 |
| EP | 0972663 | 1/2000 |
| EP | 1022172 | 7/2000 |
| EP | 1643064 | 4/2006 |
| FR | 2385870 | 10/1978 |
| FR | 2937669 | 4/2010 |
| WO | 2009074625 | 6/2009 |

OTHER PUBLICATIONS

PCT International Preliminary Report on Patentability for PCT/EP2010/058752, corresponding to U.S. Appl. No. 13/379,189 mailed Sep. 28, 2011, 5 pages.

* cited by examiner

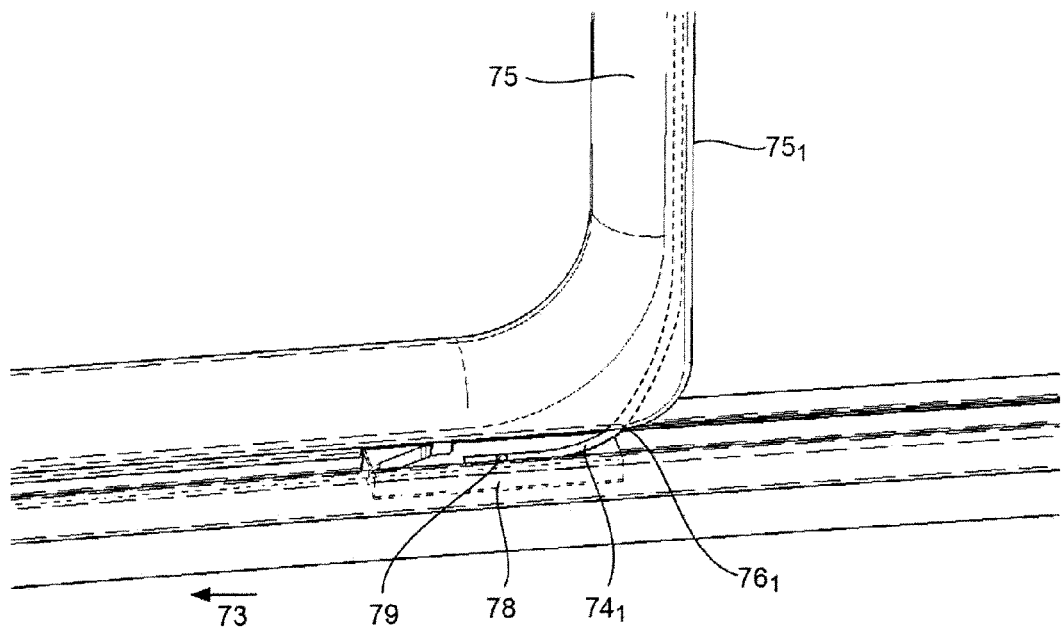
Fig. 7.1
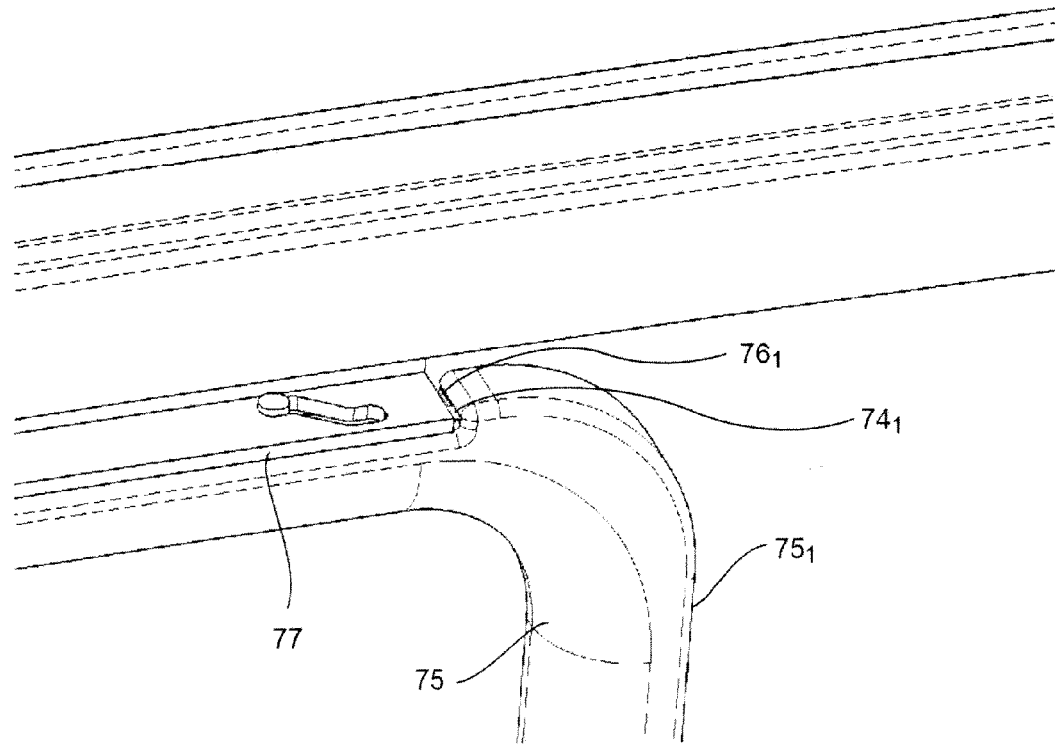
Fig. 7.2

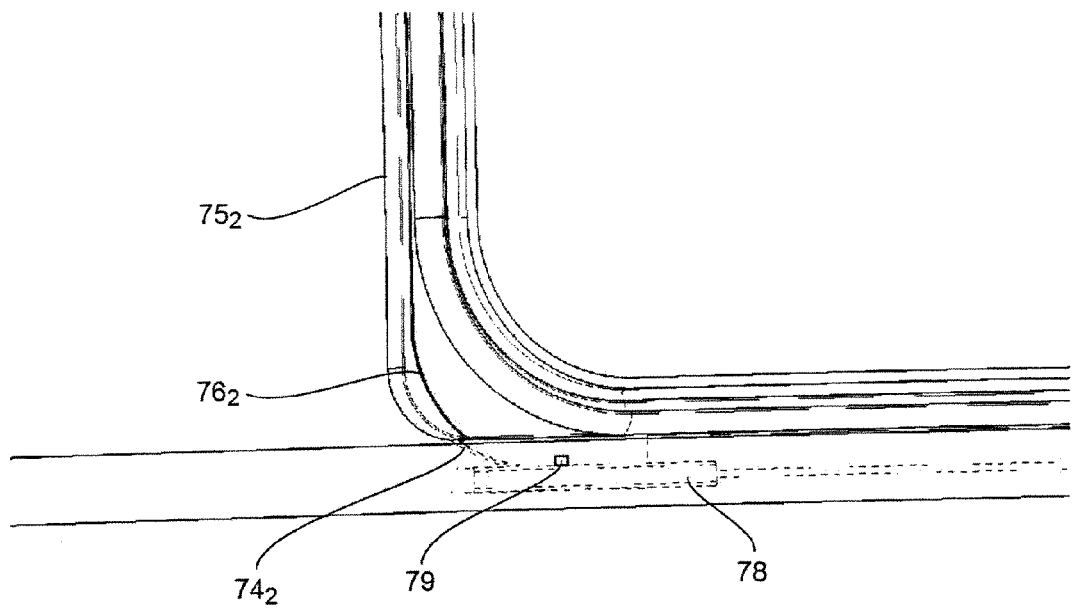
Fig. 7.3
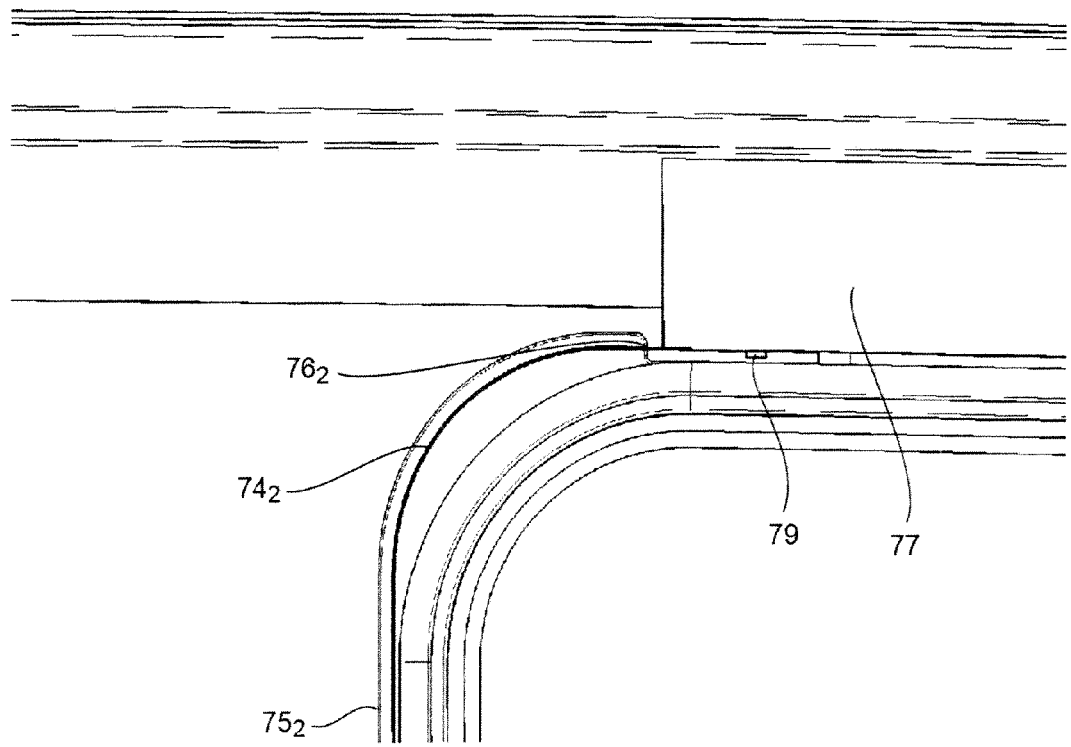
Fig. 7.4

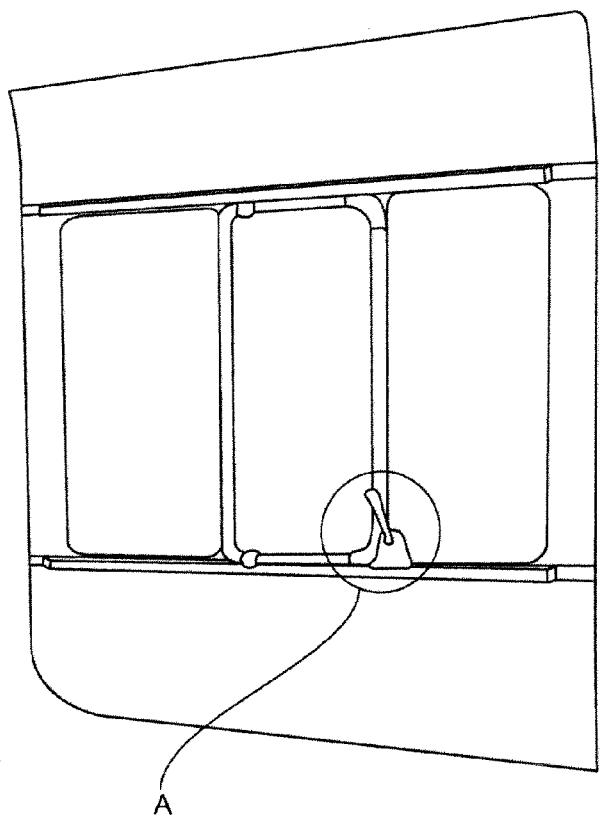
Fig. 7.5
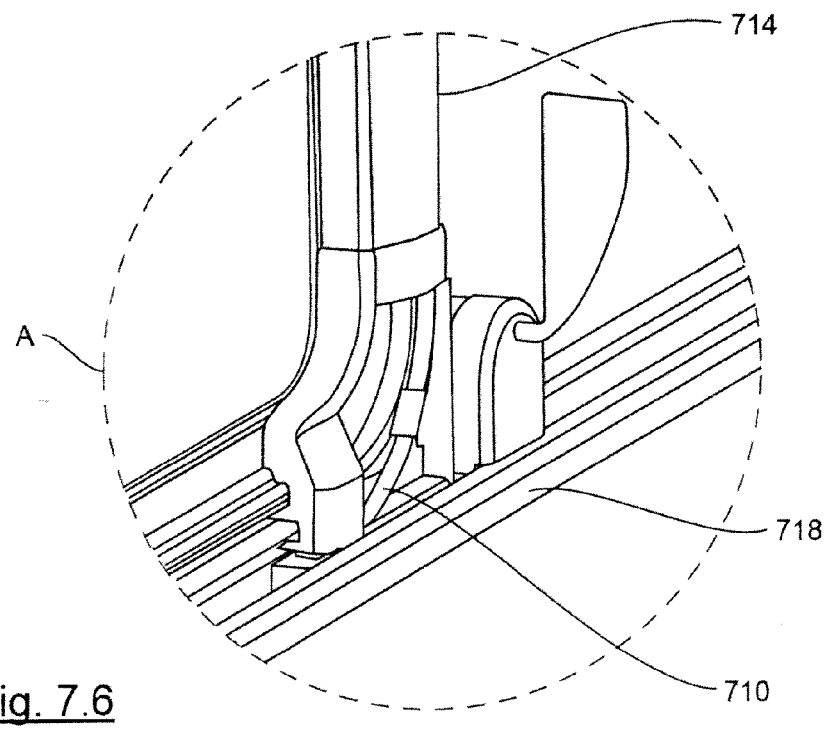
Fig. 7.6

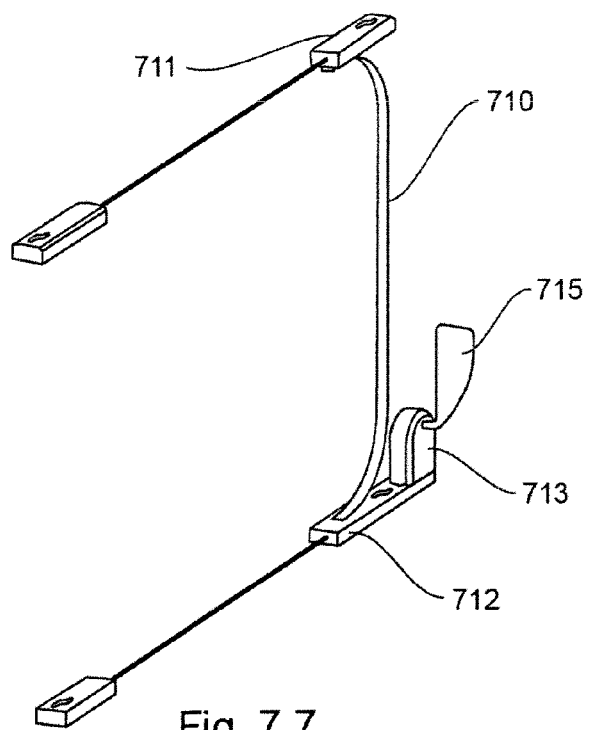
Fig. 7.7
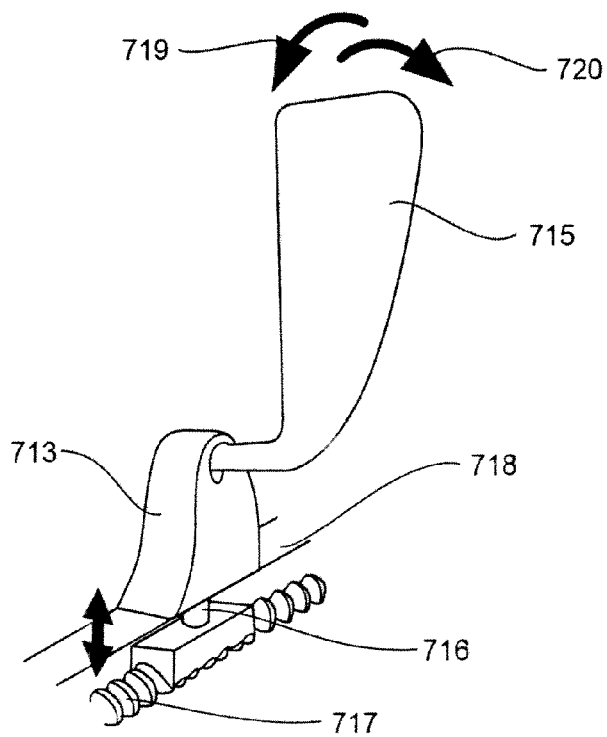
Fig. 7.8

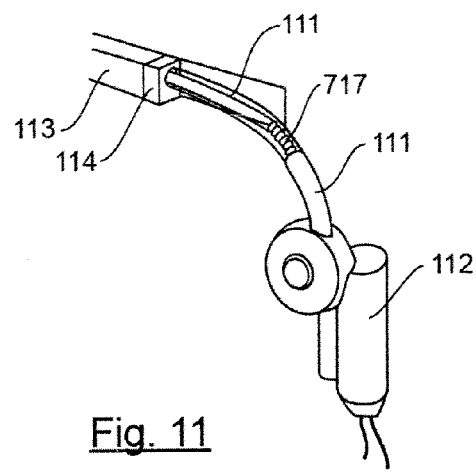
Fig. 11
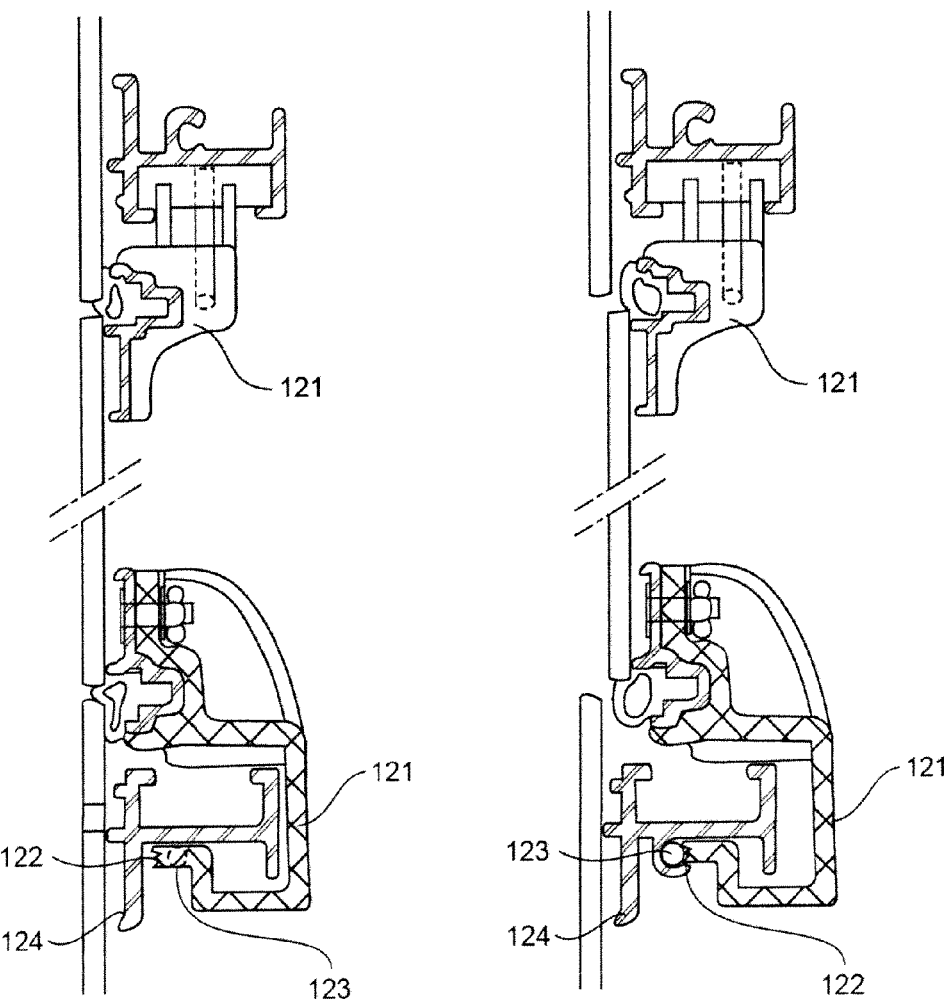
Fig. 12.1  Fig. 12.2

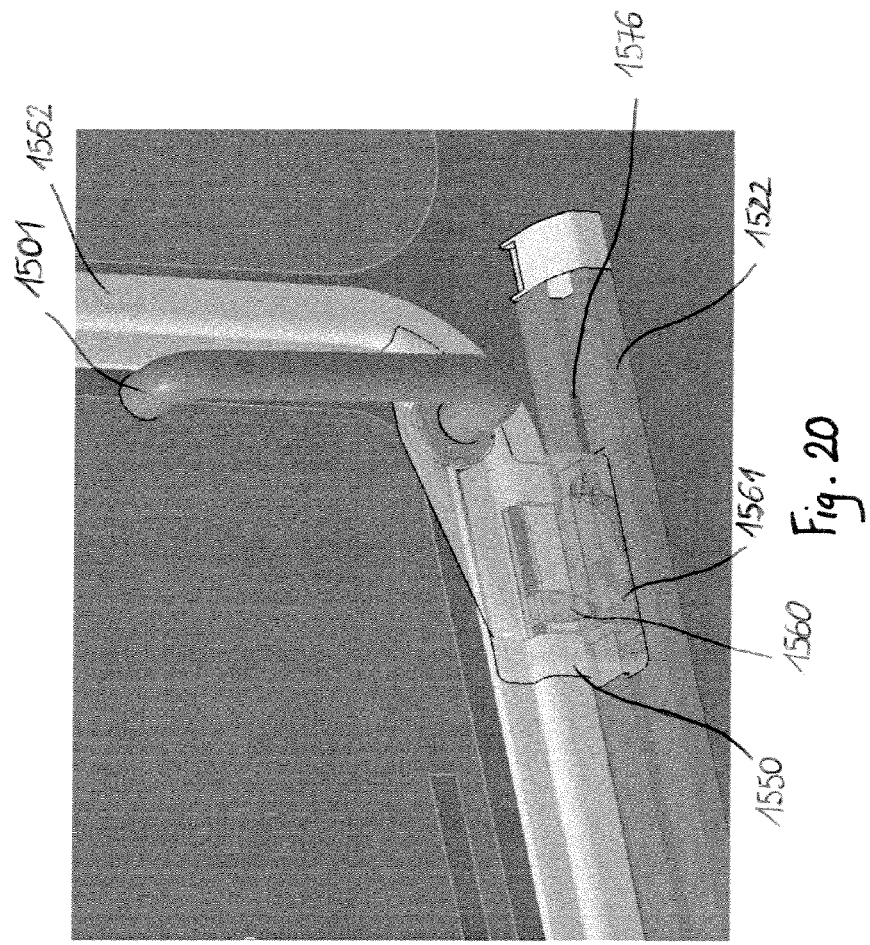
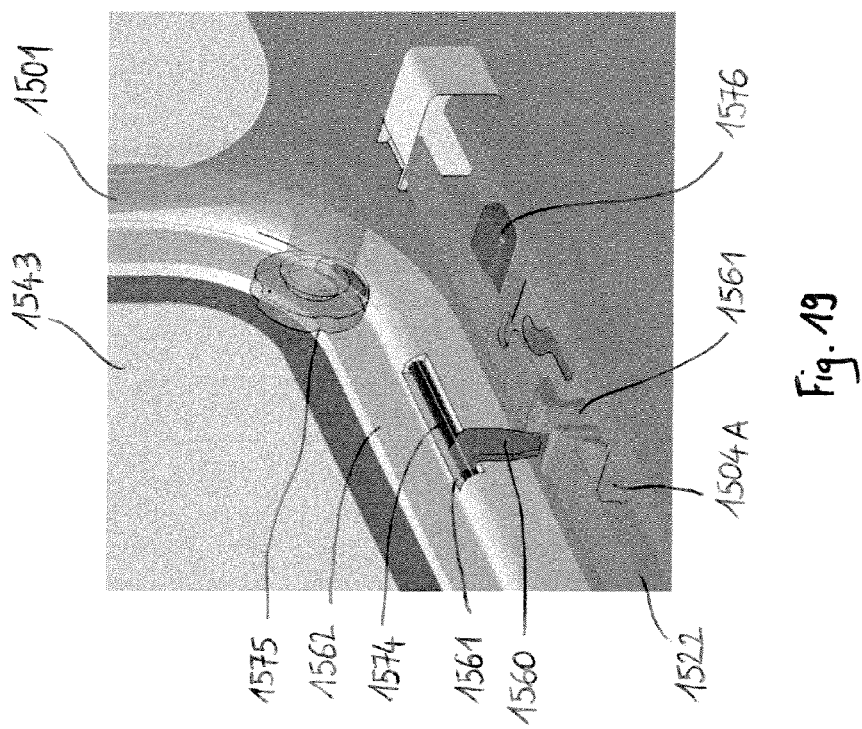

DEVICE FOR CLOSING OFF AN OPENING MADE IN A STRUCTURAL ELEMENT COMPRISING SYNCHRONIZATION, AND CORRESPONDING AUTOMOBILE

CROSS-REFERENCE TO RELATED APPLICATIONS

This Application is a Section 371 National Stage Application of International Application No. PCT/EP2010/058752, filed Jun. 21, 2010, which is incorporated by reference in its entirety and published as WO 2010/146185 on Dec. 23, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the openings (or bays) used especially in motor vehicles. More specifically, the disclosure relates to devices for closing off an opening prepared in a structural element, for example in the bodywork of a vehicle or in a door of the vehicle, and comprising a sliding mobile part capable of releasing or closing an aperture, in presenting a flush aspect when seen from the exterior. Such devices which have been developed for many years by the holder of the present application, are known for example as "flush bays".

BACKGROUND OF THE DISCLOSURE

Conventionally, to close off the opening of a vehicle, whether it is an automobile, a utility vehicle, a truck, a bus or a railway carriage, a window is added, and is held in place by a connecting frame. This frame has an internal part and an external part which simultaneously grip the edges of the window glass and the aperture prepared in the body, with a seal lining.

The technique most commonly widespread for opening and closing a door window is that of making it vertically mobile in its own plane, in making it penetrate or exit the housing or the lining of the door. Panels that slide horizontally along rails formed in a frame are also known.

This technique is now commonly used and solutions to automate it are known. Providing automobiles with electrical windows is very widespread today.

This technique however has many relative drawbacks, especially with respect to problems of sealing and/or in terms of aesthetics.

Another technique has therefore been proposed by the holder of the present patent application. The principle of this technique is described in particular in the patent documents EP-0 778 168 and EP-0 857 844. The device for closing off (here below called a "flush opening" device) presented in these documents has a fixed structure and a part, or sliding panel, that is mobile relatively to this fixed unit. The mobile part is connected to the fixed unit by functional elements that provide the required mobility and are added to the face of the fixed part turned towards the interior of the vehicle.

Such a flush opening can be mounted fully independently of the vehicle and can be added from the exterior, in the housing defined for this purpose on the bodywork of the vehicle. It can also be fastened, in particular by gluing, to the lower portion of a door, according to the technique described in patent document EP-1 022 172. As such, most of the sealing problems identified hereinabove are resolved. The same approach can also be used to make roofs and especially window-fitted roofs provided with an opening.

From an aesthetic standpoint, when viewed from the exterior, the flush opening has a smooth, flush aspect due to the fact that no frame is needed on the outline of the aperture formed in the fixed unit.

In order to provide a sliding of the mobile part, which is generally constituted by a transparent panel, a guide device is provided, for example comprising a first and second guide rails mounted so as to be fixed on to the fixed unit (or fixed structure) of the opening, on either side of the aperture closed by the mobile panel. This panel is mounted on the rails to slide for example in a longitudinal direction in a plane of sliding between one (or more) positions of opening and an intermediate clearing position in which it faces the fixed panel and is cleared from it.

It will be noted that it has been envisaged to move the mobile part between the closing-off position and the intermediate clearing position, primarily according to two techniques:
  a first technique for which the moving of the mobile part is a combination of a movement in a direction parallel to the plane of the fixed part and a movement in a direction perpendicular to this plane, in the form of a general swaying motion, in which the distal edge of the mobile part is, at the end of travel, in the plane of the opening (the mobile part being then "across" between the closing-off plane and the sliding plane). It is then enough to bring the proximal edge, for example manually, to provide for the closing off; and
  a second technique for which the mobile part remains constantly in a plane that is substantially parallel to the plane of the fixed part during its movement.

An embodiment of the invention relates more particularly to this second technique for closing off, its alternatives and its improvements.

The holder of the present patent application has indeed proposed an improvement in the guiding and locking of such "flush openings" described especially in the document PCT/EP2008/067264 (U.S. Publ. No. 2011/0006558), incorporated by reference in the present description.

In this approach, the flush opening comprises a fixed structure in which there is defined an opening and at least one sliding panel having a frame bearing at least one guiding peg (generally two pegs on the upper part and two pegs at the lower part). Two slides, or shuttles, fixedly joined to the pegs are provided and assembled so as to enable a relative movement of the slides with respect to a corresponding guide element along the sliding axis of the sliding panel so as to enable a movement of said sliding panel in a direction perpendicular to the plane of said fixed structure.

Thus, the sliding panel is fixedly joined directly to a guide element and to at least one slide by means of the guiding pegs, guided in a rail path of a simple, appreciably rectilinear form so as to enable it to be made mobile in the direction of the sliding axis or perpendicularly to the plane of the fixed structure.

It will be noted that the term "plane" herein is understood in a broad sense: the plane formed by the opening is sometimes curved, in one or even two directions (this also justifies in certain cases the term "substantially" used in the description and the claims).

This device therefore makes it possible to rest the sliding panel on a widened surface of the rail by means of the sliding element and the slide and to use rails of a limited thickness corresponding appreciably to the thickness of the slide or the sliding element and/or to the thickness planned for the gluing of the rail on to the fixed structure.

This interesting technique proves however to be difficult to implement on an industrial scale both for manual flush openings and for motor-driven (also called electrical) flush openings.

Indeed, the mobile panel tends to press against the rails when the actuation of the handle is not done exactly at the centre of the handle, i.e. at equal distance between the two shuttles. When the actuation is off-centered, the forces applied to each shuttle are different, thus leading to an arching of the mobile panel or even to a complete jamming of this mobile panel.

However, it is not easy to verify whether the user has made a centered actuation, especially for a handle as described in the document PCT/EP2008/067264, already referred to, that extends throughout the height of the sliding panel.

This risk of strain is reinforced by the major tolerance values dictated in the automobile field, which do not allow any fine adjustment of each opening but on the contrary require clearances of several millimeters.

In these many embodiments, it is also necessary that the guide rails of the mobile panel should not be parallel, thus adding further strain and further increasing this risk of arching.

The problem is similar in the case of electrical flush openings. The force provided to the lower shuttle, as proposed in the document PCT/EP2008/067264 risks being different from the one applied to the upper shuttle through the crossbeam, which may lead to arching and/or jamming.

Consequently, the manufacture of these openings and their integration into the vehicle are generally complex and costly.

Another drawback of this prior-art technique is that it makes it necessary, especially in a manual implementation, to have a frame and/or a handle that are relatively thick, interfering with transparency in the opening and in certain cases affecting aesthetic quality.

SUMMARY

An exemplary embodiment of the disclosure relates to a device for closing off an opening made in a structure, comprising a fixed panel in which there is defined an aperture and at least one sliding panel, comprising:

two shuttles, named an upper shuttle and a lower shuttle, respectively guided in two distinct guide rails mounted and/or formed on the surface of said fixed panel turned toward the interior of said vehicle;

a frame bearing at least two guiding pegs respectively engaging with each one of said shuttles, the latter comprising means for guiding said pegs enabling a transverse movement of said frame relative to said shuttles;

means for actuating acting directly or indirectly on said shuttles in order to move the latter in said rails, causing said sliding panel to move in a direction perpendicular to the plane of said fixed panel.

This approach provides for simple and efficient assembly, with a rail that may be of a reduced dimension and is essentially rectilinear (the shuttle moves substantially rectilinearly in the rail or in the same direction as the rail, and the movement of opening/closing or changing of plane is achieved by the cooperation between the pegs, the shuttles and the rail).

According to an embodiment of the invention, the closing-off device comprises means for synchronizing said means for actuating so as to balance the movement of said shuttles, said means for synchronizing comprising at least one intermediate linking element which links one of said shuttles and one synchronizing element.

The means for actuating comprise for example a handle acting directly on the shuttles or a motor-driven system acting on the shuttles through transmission means comprising a "push-pull" cable which may be a toothed or multistrand cable for example.

Thus, a synchronized moving of the shuttles is obtained, for example by applying identical forces, or at least forces that are sufficiently similar, on both shuttles, and the arching and jamming of the sliding panels in the rails is avoided, even in the presence of relatively large clearance values.

As shall be seen here below, this enables the sliding panel to be actuated efficiently, manually or being motor-driven, without calling for any particular placing or central handling of the handle.

Such an opening can especially be made in the body of an automobile vehicle or any other type of vehicle or in the structure especially of a wall of a caravan or a camping car for example.

According to one particular characteristic of an embodiment of the invention, said means for actuating comprise a linking portion linking said shuttles and extending between said rails perpendicularly to the axis of movement of said shuttles. In this case, at least one part of said means for synchronizing is carried by and/or housed in said linking portion.

This linking portion can be especially a part of the frame.

According to a first advantageous embodiment, said means for synchronizing comprise at least one synchronizing element circulating in said linking part, between at least two guiding elements provided for this purpose on said linking portion.

In particular, said means for synchronizing comprise two synchronizing elements that cross each other in said linking part and are extended in and/or along said rails.

This element or these elements are for example cables, straps, wires, belts or the like.

This element or these elements, depending on their assembly, enable efficient and simple checks on the synchronization of the forces between two shuttles and prevent arching.

Preferably, said guiding elements are pulleys, fixed rollers or transfer gear elements.

According to one particular variant, the flush opening comprises means for blocking said sliding panel in every position of opening, acting on said means for synchronizing.

These means for blocking in every position can especially be adapted to prevent the moving of the mobile panel in the event of emergency braking.

According to different modes of implementation, said blocking means act on at least one of said cables and/or on at least one element carried by one of said cables and/or at least one of said guiding elements.

The frame may especially in this case carry an handle for unlocking and/or moving said sliding panel, capable of taking a default locked position and an unlocked position and said handle may control said blocking means.

According to a second embodiment of the invention, said means for actuating provide for direct actuation on a first of said shuttles and said means for synchronizing provide for a transmission of an actuation transmitted to the second of said shuttles.

Again, we thus obtain an efficient synchronization between two shuttles, although the mounting of these means for actuating is asymmetrical.

Said means for synchronizing can especially comprise a push-pull cable and/or a leaf spring.

According to a third embodiment of the invention, said means for synchronizing comprise at least one leaf spring (or metal foil), connected on the one hand to a handle and on the other hand to one of said shuttles.

In at least one particular embodiment of the invention, said means for synchronizing comprise a leaf spring, each end of which is connected to one of said shuttles, said handle acting on or in the vicinity of the central portion of said spring blade.

According to one particular aspect of an embodiment of the invention, said handle conveys a movement to said leaf spring that is substantially parallel to the axis of sliding of the sliding panel.

According to a fourth embodiment of the invention, said means for actuating comprise at least one unlocking and moving handle placed on a portion of the frame of the sliding panel parallel to at least one of said guide rails.

Said handle can especially comprise two grasping elements which can take a default locked position and an unlocked position when they are made to approach each other.

According to a fifth embodiment of the invention, said intermediate linking element comprises a shaft. In at least one embodiment of the invention, said means for synchronizing comprise two intermediate linking elements, each of said elements linking one of said shuttles and said synchronizing element.

According to certain modes of implementation, said means for actuating comprise electrical or pneumatic drive means, for example, at least one electrical motor or at least one pneumatic actuator. It must be noted that the structure of an embodiment of the invention makes it possible, starting from a same basis, to provide manual openings or motor-driven openings without any complex modification or adaptation.

In at least one embodiment of the invention, the frame may bear a first unlocking handle for unlocking said sliding panel and a second handle for moving said sliding panel.

In at least one embodiment of the invention, said synchronizing element belongs to the group comprising cables, leaf springs and metal foils.

An embodiment of the invention also pertains to automobile vehicles comprising at least one closing-off device as described here above. This device can especially be mounted on a lateral wall of the vehicle or on a door or can form a part of a roof.

BRIEF DESCRIPTION OF THE DRAWINGS

Other features and advantages shall appear more clearly from the following description of five particular embodiments of the invention and of a few examples of variants, given by way of simple illustrative and non-restrictive examples, and from the appended drawings, of which:

FIGS. 7.1 to 7.4 are detailed views respectively of the lower right-hand corner, the upper right-hand corner, the lower left-hand corner and the upper left-hand corner of a first example of implementation of the second embodiment presented in FIG. 7;

FIGS. 7.5 to 7.7 illustrate a second example of implementation of this second embodiment;

FIG. 7.8 provides a detailed view of the handle of the flush opening presented in FIG. 7;

FIG. 11 illustrates the conversion of a manual version into a motor-driven version;

FIGS. 12.1 and 12.2 relate to another variant of the second embodiment;

FIGS. 19 and 20 illustrates a fifth embodiment of the invention implementing a swaying shaft linked to the frame of the mobile panel and engaging with a shuttle of the lower guiding rail.

DETAILED DESCRIPTION OF ILLUSTRATIVE EMBODIMENTS

1. Reminder: Flush Opening Equipped with Shuttles

As already mentioned, an embodiment of the invention applies especially to flush openings equipped with shuttles as described in the document PCT/EP2008/067264 already mentioned and the content of which is incorporated by reference in the present description.

However here below we recall the essential aspects of this technique with reference to FIGS. 1A, 1B and 2.

The general principle of this technique in its version used in the framework of an embodiment of the invention relies especially on the implementation of two driving slides or shuttles, one or more guiding pegs, fixedly joined to the sliding panel and an element for guiding the panel, guided along the axis of the rail and mobile relatively to each other to enable the moving of the sliding panel in the direction perpendicular to the plane of the fixed structure.

Figure 1A:
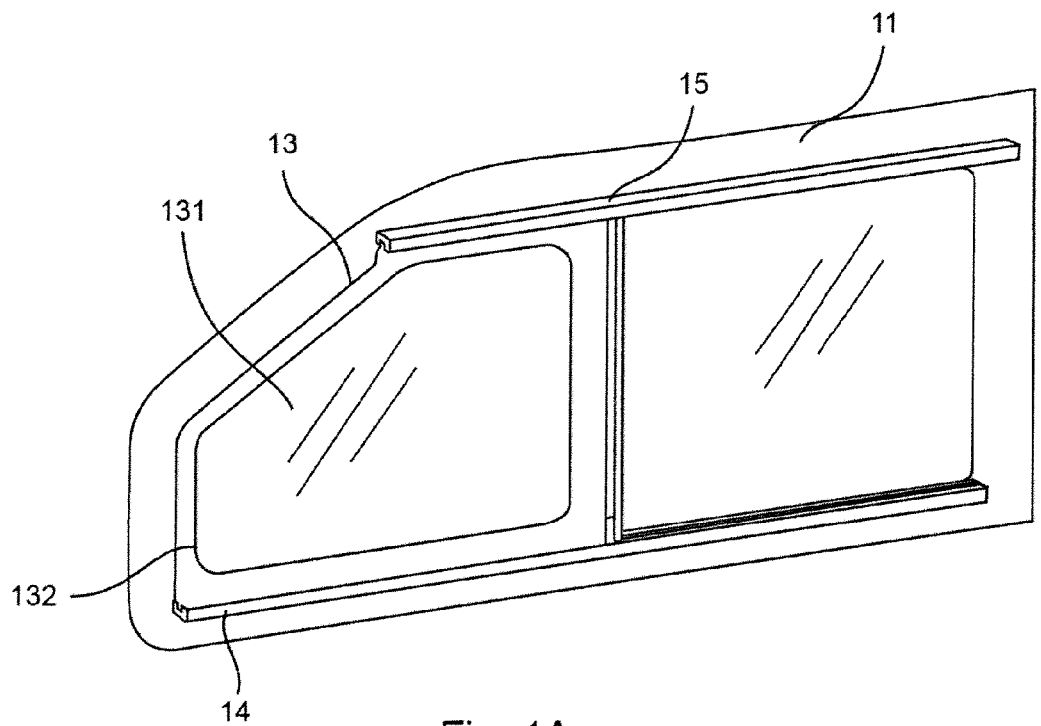
FIGS. 1A and 1B provide an illustration, in a view in perspective, of one embodiment of a device for closing off as described in the document PCT/EP2008/067264, respectively in a position of closing off the aperture and in a partial opening position.
Figure 1B:
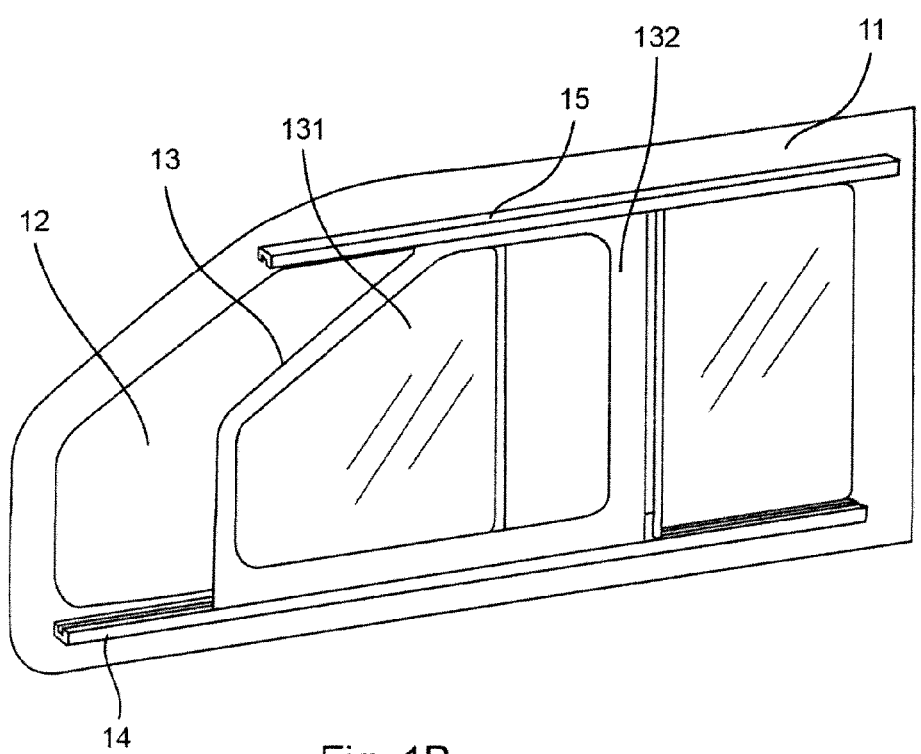

FIGS. 1A and 1B show a view in perspective of an embodiment of a flush opening of this kind with manual opening to close off an opening prepared in a lateral wall of the bodywork of a vehicle. This example is non-exhaustive, for such an opening can be prepared in the structure of a caravan or a camping car for example.

This device for closing off thus has a fixed part 11, generally made of transparent material, also called a fixed unit or fixed panel in which an aperture 12 is pierced. A sliding panel 13 that is mobile relatively to this fixed panel 11 enabling the opening to be completely closed off (see FIG. 1A) is designed to slide and partially (see FIG. 1B) or totally release this aperture.

The sliding panel comprises a window 131 provided with a frame 132 that can be guided along two substantially parallel rails 14 and 15 mounted on the interior face of the fixed panel 11, respectively in the lower portion and the upper portion. In one variant, these rails can also be non-parallel.

Figure 2:
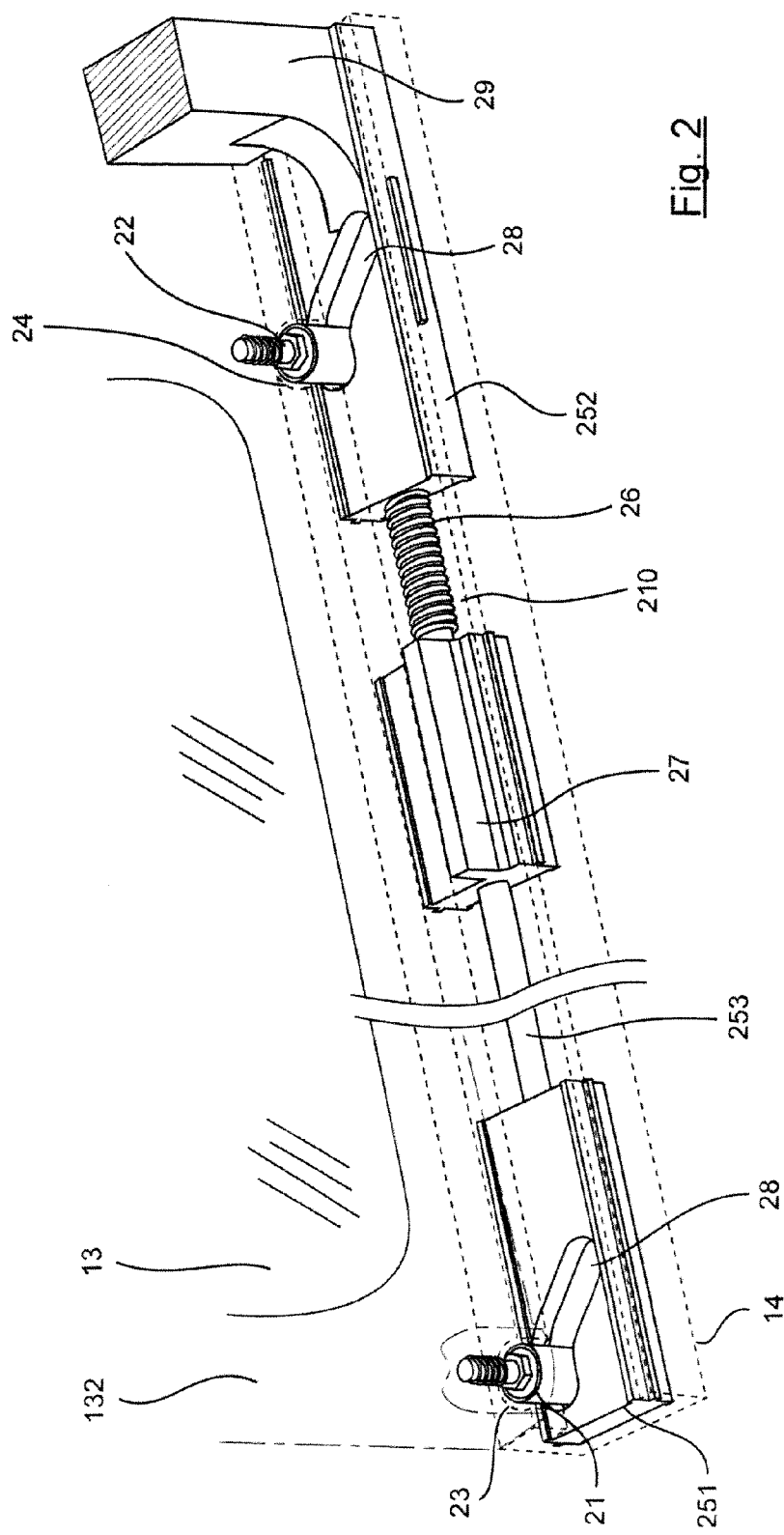
FIG. 2 is a detailed view of the lower part of the device for closing off presented in FIGS. 1A and 1B.

FIG. 2 provides a detailed view of the lower portion of this flush opening in which the frame 132 of the sliding panel and the rail 14 are represented in dashed lines, it being possible to deduce the upper portion by simple symmetry.

In its lower part, the sliding panel 13 has two guiding pegs 21 and 22 fixed to the frame 132 in this embodiment of the invention. In the closed-off position of the aperture shown in this figure, the pegs 21 and 22 cooperate with two identical cross strike plates 23 and 24 formed in the thickness of the rail 14 to provide for the locking of the sliding panel 13.

A slide 25 forming a shuttle facing the position of the sliding panel 13 is housed in the internal slideway of the rail 14 appreciably aligned with the sliding panel. It has two guide pads or shuttles 251 and 252 rigidly connected by a connecting bar 253.

The pad 252 is fixedly joined to a handle 29. It stretches along the vertical edge of the frame 132 and connects the lower slide 25 to the upper slide, which is mobile in the rail 15, through a rectilinear groove 210 oriented along the axis of the rail 14, communicating at a right angle with the strike plates 23 and 24.

A coiled return spring 26 (optional) mounted around the bar 253 is housed between the pad 252 of the slide and an element 27 fixedly joined to the frame 132. This element 27, mobile relatively to the bar 253 which it straddles, can slide in the slideway of the rail 14.

Figure 3:
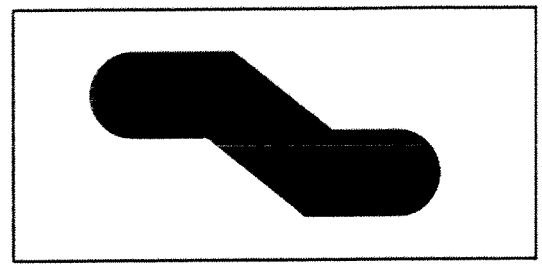
FIG. 3 provides a schematic illustration of the guiding applied to a peg of the device for closing off of FIG. 2.

A guiding channel 28, the profile of which is shown schematically in FIG. 3, is formed in each of the pads 251, 252 to receive the base of each peg 21, 22, exiting beneath the strike plate.

In the position shown in FIG. 2, the handle 29 is released. The action of the spring 36 has pushed the pad 252 back rightwards, the bottom of the channel 28 abutting the pegs 21, 22. Each peg 21, 22 is then immobilized, the exit of the strike plate being arranged perpendicularly to the direction of circulation in the channel.

Other precisions and variants are provided in the document PCT/EP2008/067264.

2. Principle of an Embodiment of the Invention

Figure 4:
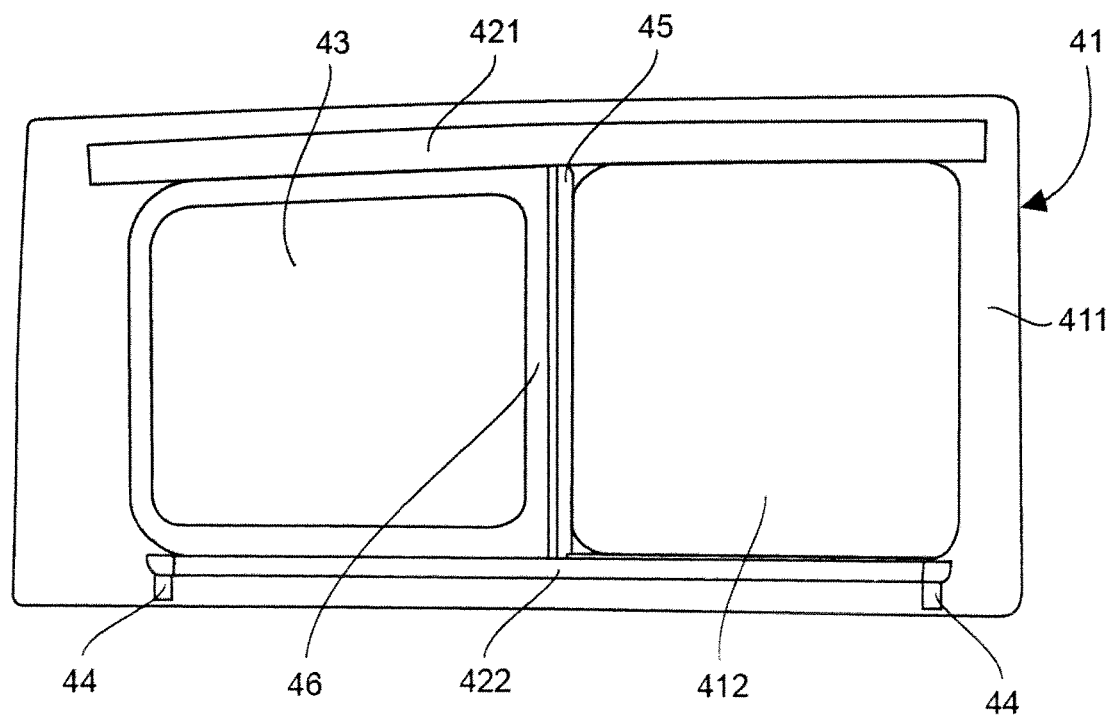
FIG. 4 is an example of a flush opening with non-parallel rails to which an embodiment of the invention can be applied.

As indicated here above, one drawback of this technique is that it is subjected to phenomena of arching and jamming when the forces applied to the two shuttles are not symmetrical and/or the rails are not parallel as on the flush opening illustrated in FIG. 4.

This opening therefore comprises a fixed part 41 herein made of two parts, a first part 411 defining the outline of the opening, generally made of an opaque or screen-printed material and having a substantially trapezoidal (the left-hand part being narrower than the right-hand part) or rectangular shape, and a transparent and fixed part 412 contained in a first aperture defined in the first part.

FIG. 4 illustrates the opening seen from the interior of the vehicle. On this surface of the fixed part 41 pointed inwards, there are mounted, for example by gluing, two rails for guiding and holding a panel 43 that is mobile in sliding relatively to the fixed part 41. The upper rail 421 and the lower rail 422 are herein not parallel in order to substantially follow the outlines of the fixed part 41 (which are themselves dictated by the shape of the body of the vehicle).

The lower rail 422 is especially equipped with means for recovering and discharging water 44. The upper rail 421 is covered with a protective and holding tape, for example the type described in the patent document FR-0857313, not yet published.

An embodiment of the invention improves the control of the moving of the mobile panel 43, by means of means for synchronizing. The term "synchronization" indicates that these means ensure that the movement of the upper and lower shuttles is obtained synchronizedly as described here below, under the effect of a single command.

This approach, although illustrated with reference to non-parallel rails, can naturally also be implemented in the context of parallel rails.

As shall be seen here below, in certain embodiments, the means for synchronizing also make it possible to optimize the braking or blocking of the sliding panel in any position of opening.

According to the embodiment illustrated in FIG. 4 which shows a manual opening, the unlocking and the movement of the sliding panel 43 are effected by means of the handle 45, or maneuvering bar, which extends between the two rails 421 and 422 along the edge 46 of the frame of the mobile panel 43, this handle being mobile relatively to the frame, in parallel to the axis of movement of the mobile panel 43. In one variant of this embodiment, the handle 45 can extend beyond the upper rail 421 and/or the lower rail 422.

3. First Embodiment

3.1 Balancing and Synchronization

Figure 5:
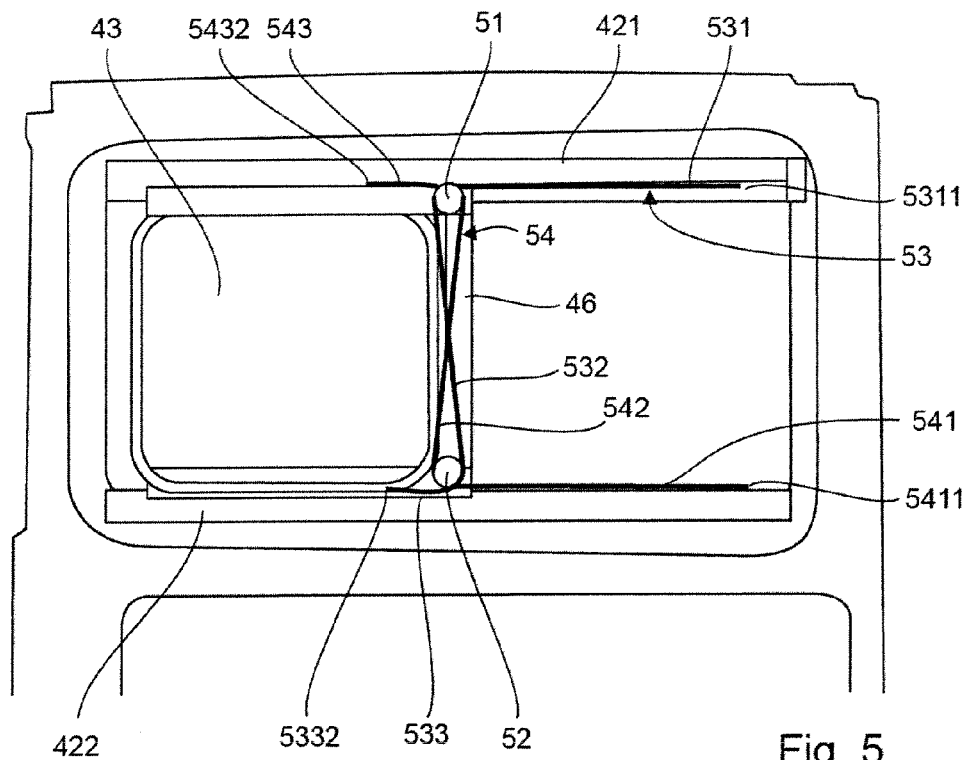
FIG. 5 is a first embodiment of a flush opening according to the invention implementing means of synchronization comprising two balancing cables.

According to a first embodiment of the invention, the balancing means are mounted in the portion of the frame 46 (or in the handle or pullbar 45) as illustrated by FIG. 5. These balancing means enable the synchronization of at least one upper shuttle and at least one lower shuttle (not shown). Should two shuttles be implemented in each rail, the upper shuttles are, in the same way as with the lower shuttles, rigidly linked by a connection bar as described above with reference to FIG. 2.

The frame portion 46 therefore comprises a balancing and synchronization system comprising two pulleys 51 and 52 (or more generally cable-guiding means) which cooperate with two balancing and synchronization cables 53, 54 crossing each other at the middle of the frame portion 46 (or in the handle or pullbar 45).

The first cable 53 has a first portion 531 extending along the rail 421 from a first end 5311 up to the pulley 51. This pulley 51 sends on a second cable portion 532 up to the second pulley 52. A third cable portion 533 extends from this second pulley 52 up to a second end 5332, parallel to the rail 422.

Symmetrically, a second cable 54 extends from the first end 5411 of the rail 422 up to the pulley 52 and then transversally up to the pulley 51 and finally in parallel to the rail 421 up to the second end 5432.

The ends 5311, 5332, 5411 and 5432 of the cables are fixed to the fixed part or to an element fixedly joined to it, especially the rails. The ends 5332 and 5432 of the cables are respectively connected to the lower shuttle and to the upper shuttle (not shown) of the mobile panel.

The two cables 53 and 54 share the pulleys 51 and 52, thus defining a balancing and synchronization system. This approach ensures that the two ends of the portion 46 of the frame, and therefore the entire sliding panel, move similarly and in a balanced way while ensuring a synchronization of the upper and lower shuttles.

The pulleys 51 and 52 therefore each receive the balancing and synchronization cables 53 and 54 which cross each other. Thus, both of them move by the same distance, because of these crossed cables, providing for the requisite balancing and synchronization.

The pulleys 51, 52 may have a grooved wheel adapted to receiving the two cables 53, 54. According to another embodiment, the pulleys may have two grooved wheels each associated with one of the cables.

In variants, the cable guiding means comprise fixed rollers or transfer gear elements.

3.2 All-Position Blocking

This approach makes it possible to hold the mobile panel in any open position since, whatever its position, the pulleys and the cables provide for the balancing and synchronization of the upper and lower shuttles.

If holding the panel in any unspecified position appears to be insufficient relatively to an emergency braking for example (indeed, the sliding panel should not move unexpectedly even in the event of sudden braking), an additional blocking system can be planned. In particular, this blocking system may act on the balancing and means for synchronizing described here above.

Thus, according to a first embodiment, these blocking means may act on one of the pulleys and preferably on both of them. It is thus possible to provide for blocking pads or similar elements that come into contact with the pulleys so as to prevent their rotation. So long as these blocking pads are in contact with the pulleys, the pulleys cannot rotate and the sliding panel therefore cannot be moved. It may also be planned that the blocking pads will rub at least on one rail or at least on one cable.

Unblocking means are provided to enable the sliding panel to be moved. They may be for example cables or rods whose moving is actuated by the handle 45 (or if necessary by another handle). Preferably, pullback means tend to bring the pads into the blocking position when the handle is not actuated.

According to another approach, the blocking means may act on one of the cables or on both cables. They may for example be means that clamp one of the cables between two pulleys in a blocking position. Since this cable cannot move between the two pulleys, it immobilizes the sliding panel. The handle, when actuated, releases the cable in moving the clamping means away to again enable the moving of the sliding panel.

To improve the efficiency of braking, it is possible to add, to at least one of the cables, an element having a high coefficient of friction capable of cooperating with the corresponding element on the clamping means.

3.3 Actuation

Inasmuch as the system and especially the handle or pullbar 45 can be actuated at all points between the upper rail and the lower rail (and not only by a central portion as was the case in the prior art), the sliding panel can be actuated for example at the lower part. In one particular embodiment, it is thus possible to place a handle in this lower portion.

Figure 6:
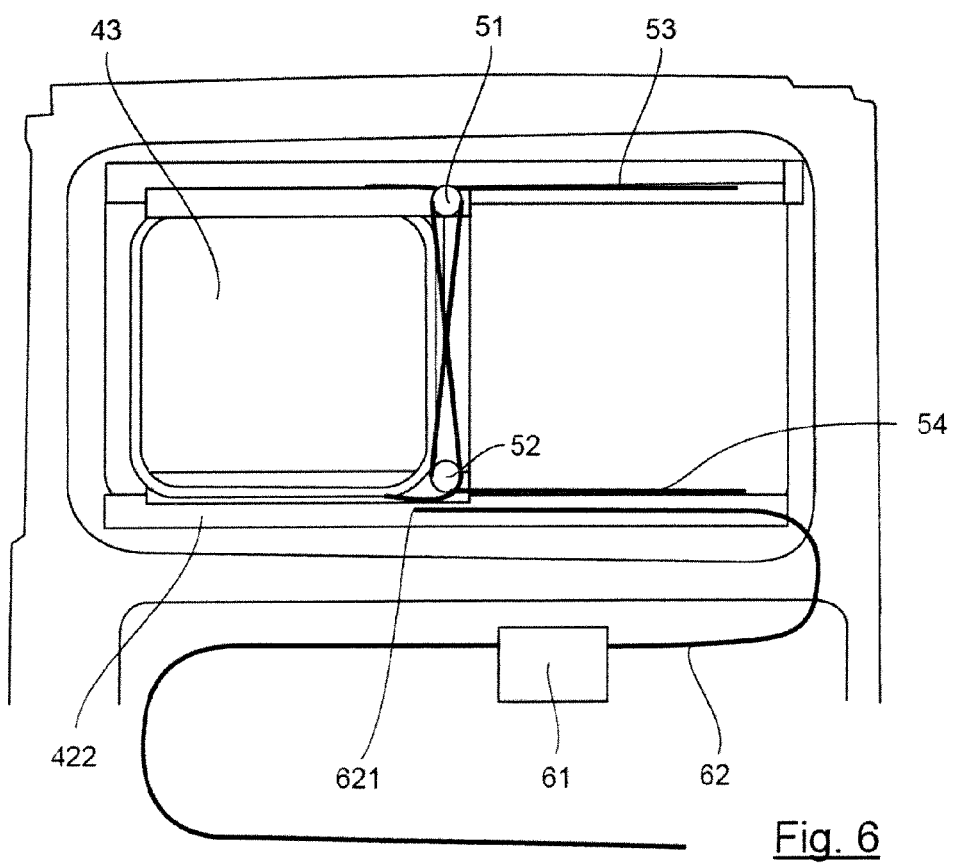
FIG. 6 illustrates a motor-driven version of the flush opening of FIG. 5.

Furthermore, this makes it possible to simply obtain an electrical or motor-driven version of the flush opening, as illustrated in FIG. 6.

In this FIG. 6, there is provision for a motor-driven system 61 which drives a push-pull cable 62, for example a notched cable or a multistrand cable in both directions of sliding. The end 621 of the cable 62 is connected to the lower shuttle (not shown) of the mobile panel, and the system for balancing and synchronization by cables and pulleys transmits, in a balanced and synchronized way, the action to the upper part of the mobile panel and especially to the upper shuttle.

4. Second Embodiment

Figure 7:
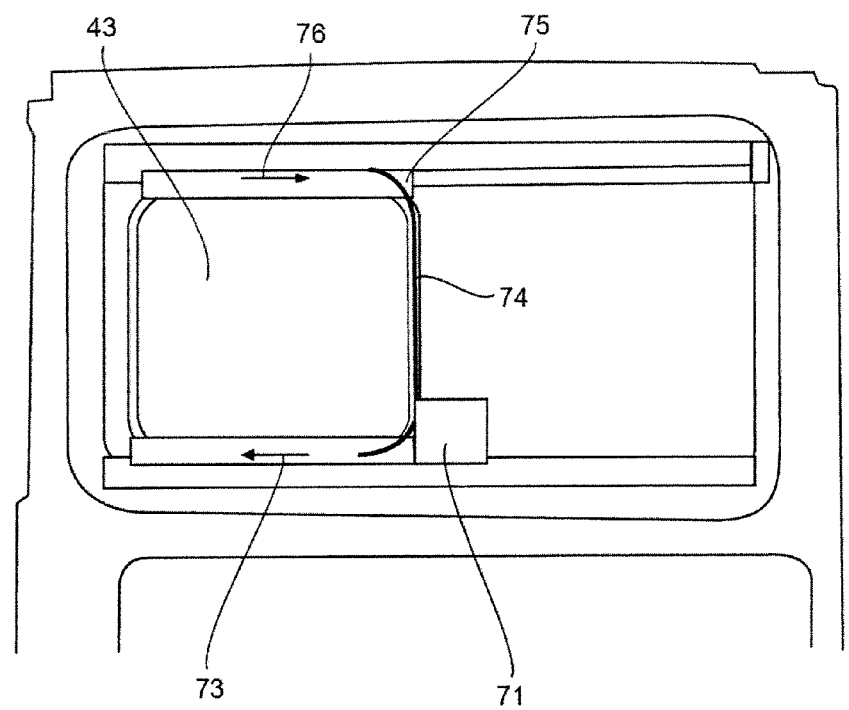
FIG. 7 presents a second embodiment of a flush opening according to the invention, implementing means of synchronization comprising transmission means.

In this second embodiment, illustrated schematically in FIG. 7, there is provided a handle 71 mounted at the lower part of the mobile panel 43 which acts directly on the lower shuttle (not shown). For example, a substantially horizontal pushing action on the handle 71, in the direction of the arrow 73, provides for the moving of the lower shuttle (or in one variant, the moving of the lower shuttles rigidly linked by a connection bar) relatively to the frame.

Means for synchronizing 74 transmitting an actuation, transmitted to one of the shuttles, to the other one of the shuttles, also called transmission means here below in the description, are provided between the lower shuttle and the upper shuttle (or between the lower shuttles and the upper shuttles), for example in the form of a synchronization cable circulating in the frame 75 of the mobile panel 72.

The synchronization cable 74 can especially be a push-pull, to-and-fro cable or a leaf spring (or metal foil). It can also be a rack element associated with a handle, for example a rotating handle to which a drive pinion or a swivel-bolt mechanism is fastened.

In other words, the handle 71 directly actuates the lower shuttle (not shown), the cable 74 or metal foil synchronizing the movement of the lower and upper shuttles.

It can be understood that in this preferred embodiment of the invention, when the handle 71 applies a force in the sense of the arrows 73 on the lower shuttle, the force applied through the cable 74 on the upper shuttle will be in the opposite sense (arrow 76). Consequently, of course, the shape of the groove for guiding the pegs (see FIG. 3) must be symmetrically inverted.

FIGS. 7.1 to 7.4, which are views of the four corners of the frame, respectively the lower right corner, the upper right corner, the lower left corner and the upper left corner, show a detailed example of implementation of this second embodiment. In this example, a first synchronization leaf spring 74 is mounted between the upper shuttle 77 and the lower shuttle 78 on the right-hand edge $75_1$ of the frame 75 facing the handle 71 (see FIGS. 7.1 and 7.2). A second leaf spring $74_2$ is furthermore mounted between the shuttles on the left-hand side of the frame $75_2$ (see FIGS. 7.3 and 7.4), so as to exert a tensile force on the upper shuttle when the handle is pushed in the direction opposite to that of the arrow 73 in order to supply the first blade, which works in thrust mode and is therefore less efficient, in the moving of the shuttle 77.

The first leaf spring 74₁ and the second leaf spring 74₂ are obtained from a spring-based steel foil that makes it possible to reconcile satisfactory rigidity with reduced thickness. They are guided in grooves 76₁, 76₂ from on the right edge 75₁ and the left edge 75₂ of the frame, especially to reduce risks of bending.

These blades 74₁, 74₂ are fixed at each of their ends to the shuttles by screws 79 in this particular implementation of the invention. It can be noted that any other appropriate methods such as for example bonding, riveting, snap-riveting and/or embedding by overmolding of the leaf on the frame can also be envisaged.

FIGS. 7.5 to 7.7 illustrate another example of implementation of this second embodiment of the invention in which it is planned to implement only one leaf spring 710 mounted on the right-hand edge 714 of the frame (see FIG. 7.6 which is a detailed view A of the right lower corner of the mobile panel of the flush opening shown as a whole in FIG. 7.5). In FIG. 7.7, for the sake of greater clarity, only the shuttles 711 and 712 connected by the leaf spring 710 and the handle 713 fixedly joined to the lower shuttle 712 have been shown. In this case, the leaf 710 acts on the upper shuttle 711 in push-pull mode, in transmitting the actuation transmitted by the handle 713 to the shuttle 712.

If the all-position blocking appears to be insufficient for emergency braking for example, it can be planned to add on a handle system, for example a piston-operated handle providing for an indexing or a braking on the lower rail and/or on a rack element housed on the rail and/or on the leaf. FIG. 7.8 gives a detailed view of a piston handle 713 equipping the flush opening shown in FIGS. 7.5 and 7.7 by way of an illustration.

As can be seen in FIG. 7.8, the handle 713 carries an ergonomic lever 715 used to actuate a piston 716 which is configured so that it can engage with a notched cable forming a fixed rack 717 housed in the rail 718.

To block the mobile panel in a determined position, it is thus enough to lower the lever 715 in the sense of the arrow 719. This indeed actuates the piston 716 which then moves downwards and gets embedded in the notches of the rack 717, immobilizing the handle 713. Conversely, the mobile panel is simply released by lifting the lever 715 in the sense of the arrow 720.

In one alternative embodiment shown with reference to FIGS. 7.5 to 7.8, the maneuvering handle for the mobile panel can be formed in the frame of this panel for example facing the lower shuttle, at mid-distance from the two shuttles, or at the height of the upper shuttle. An efficient stoppage in any opening position can be provided in this case by the frame 121 which has notches 122 which can be inserted into corresponding notches in a rack rod 123 housed in the lower rail 124 as can be seen more clearly in FIG. 12.2 in a vertical section view of the flush opening in the opening position. In this particular embodiment of the invention, it can be noted that the rod 123 is appreciably shorter than the rail to enable the closing of the flush opening (see FIG. 12.1 which is a vertical sectional view of the flush opening in the closing-off position).

Figure 8:
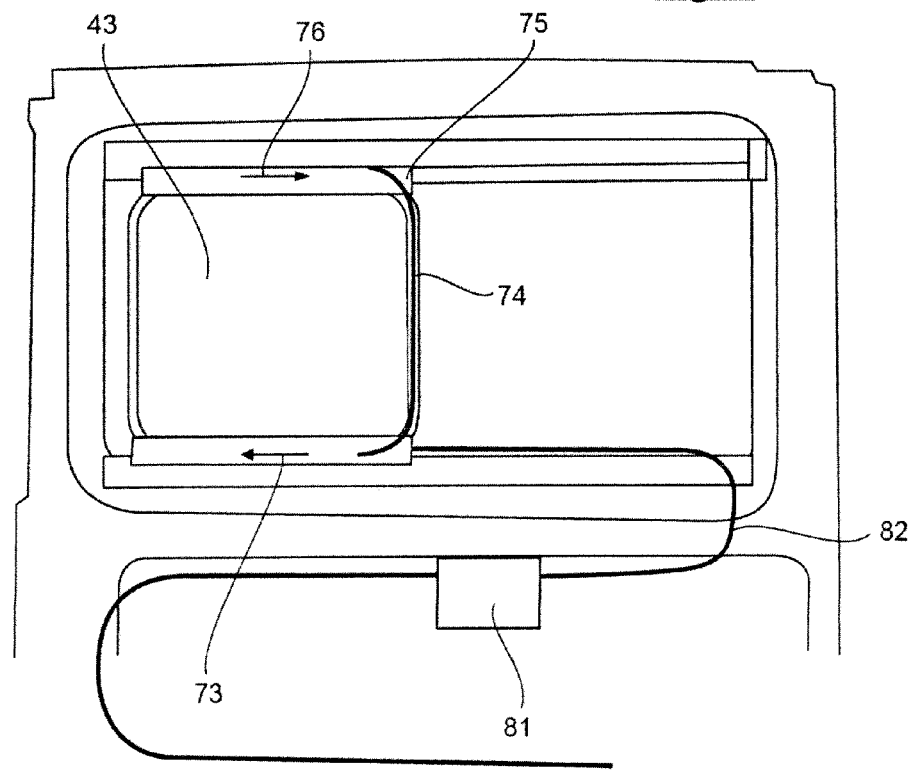
FIG. 8 illustrates a motor-driven version of the flush opening of FIG. 7.

In the same way as in the first embodiment illustrated, the second embodiment also makes it possible, in a simple way, to provide for a motor-driven version as illustrated in FIG. 8. The motor-drive means 81 drive a notched or multi-strand push-pull cable 82, which acts on the lower shuttle. The synchronization cable 74 transmits a synchronized actuation to the upper shuttle.

Thus, just as in the first embodiment, it is possible to propose, on a same basis, a manual version and a motor-driven version. Indeed, as can be seen for example in detail in FIG. 11, by connecting, through a driving guide 111 (partially shown in a sectional view in two radial half planes), the rack-forming cable 717 to a motor 112 fixed to the front end of the lower rail 113, the manual version is converted into a motor-driven version for reduced cost. It is possible furthermore to make the driving guide more rigid in providing for a linking element 114 that fits onto the rail 113 in which an end of the driving guide is inserted.

It must be noted furthermore that this second embodiment, just like the other embodiments described in detail in the present description, is not limited to one specific type of flush opening and can be implemented in the case of flush openings having a rectangular or more complex-shaped outline and/or equipped with guide rails positioned radially or gradually moving apart.

Furthermore, it is also possible, in at least one particular embodiment of the invention, to envisage the possibility of fixedly joining the handle directly and exclusively to the means for synchronizing to actuate the shuttles.

5. Another Motor-Driven Solution

Figure 9:
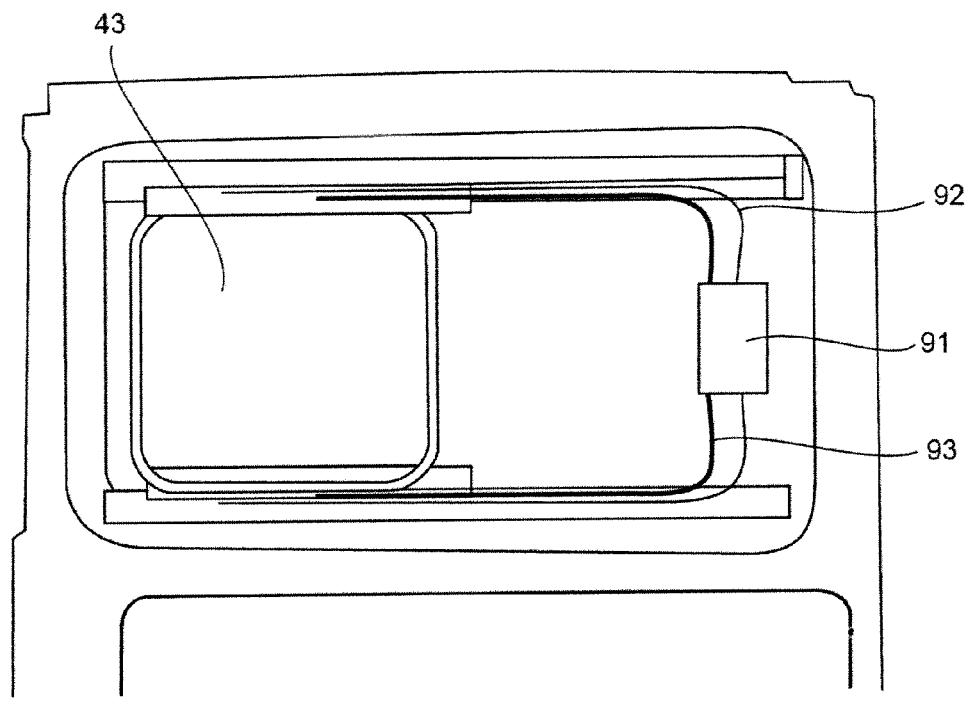
FIGS. 9 and 10 illustrate two motor-driven variants in which the shuttles are each controlled by a cable actuated by a same motor.
Figure 10:
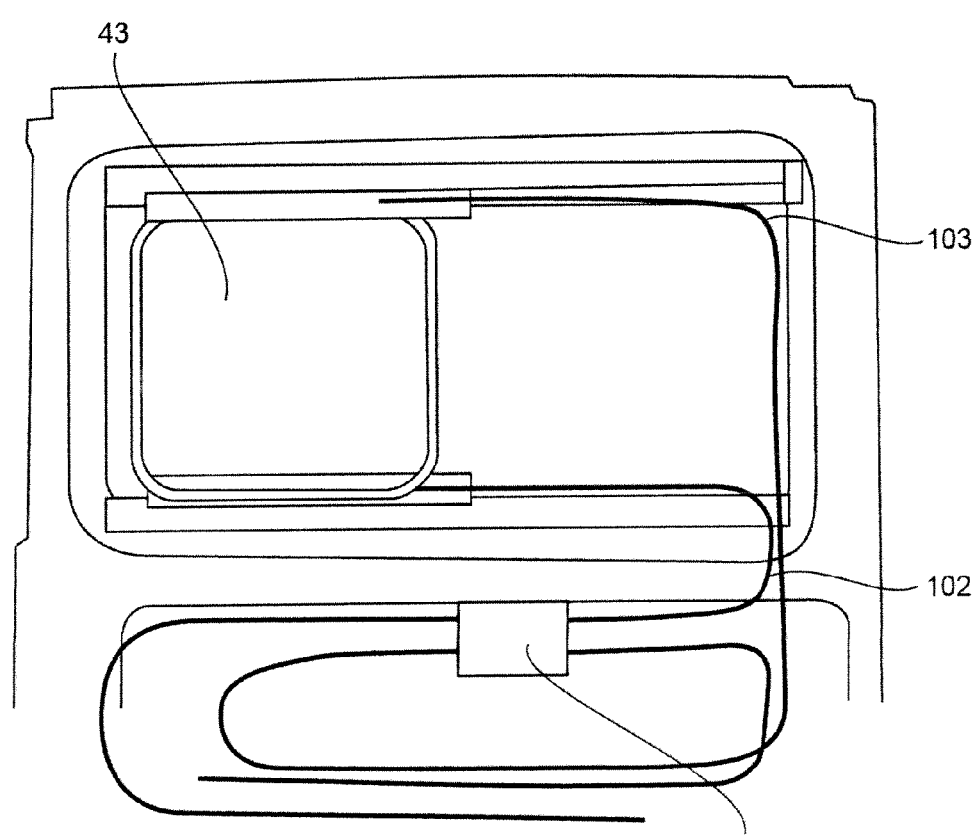

It is possible, as illustrated in FIGS. 9 and 10, to provide two distinct actuating elements, for example push-pull cables 92, 93 (FIG. 9) or 102, 103 (FIG. 10) each acting on one of the two shuttles and driven by a same motor 91, 101. Thus, a same force can be applied to both shuttles. This approach is generally reserved for specific applications because the passage of the cable or cables from the upper part of the opening is often difficult and reduces the transparency of the opening.

6. Third Embodiment

Figure 13:
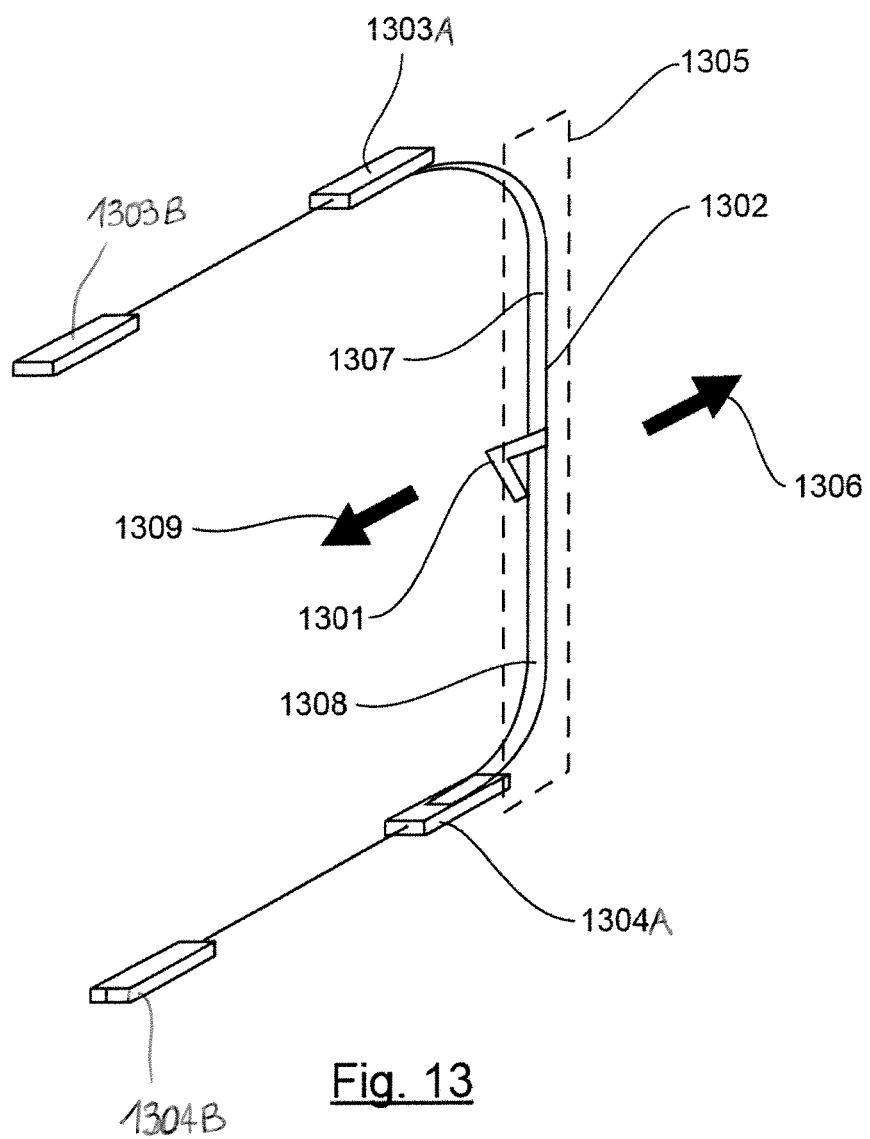
FIG. 13 illustrates a third embodiment of the invention implementing a handle acting directly on the means for synchronizing and mounted substantially at equal distance between the two shuttles.

Referring to FIG. 13, we present a third embodiment in which the handle acts directly on the means of synchronization of the shuttles.

FIG. 13, which is a partial view of the flush opening, shows that the actuating handle 1301 is mounted on a synchronizing leaf spring 1302 substantially at equal distance from the two shuttles 1303A and 1304A which are rigidly connected by a connecting bar to the shuttles 1303B and 1304B respectively. In one variant of this embodiment, it can also be planned to mount the handle between two leaf springs fixed respectively to either of the shuttles. It can also be planned that the synchronization leaf spring 1302 will not be at equal distance from the two shuttles 1303A and 1304A.

When this handle 1301 is pulled frontward, in the sense of the arrow 1306, it slides horizontally relatively to the frame 1305 (shown in this figure in dashed lines), synchronously driving the upper portion 1307 and the lower portion 1308 of the leaf 1302, and therefore the shuttles to which they are connected, in the same direction. It can immediately be understood that when the handle is pushed backwards, the shuttles get moved synchronously in the opposite sense, symbolized by the arrow 1309.

Advantageously, it can also be planned that the handle will be a rotary handle and actuate a locking mechanism, for example a pinion-and-rack assembly to ensure all-position blocking of the mobile panel in at least one of the rails. It is also possible to act on a locking handle with two portions that can be brought closer to each other by clamping between the thumb and the forefinger.

In other words, the handle for unlocking and actuating the mobile panel directly actuates the synchronization element (and not the shuttles) which could be a foil or a push-pull cable connecting and synchronizing the motion of the lower shuttles 1304A, 1304B and the upper shuttles 1303A, 1303B.

7. Fourth Embodiment

According to a fourth embodiment, the handle for unlocking and actuating the mobile panel is formed on the lower part of the frame of this panel and its moving is done in parallel to the lower rail (in other applications, it could be implemented similarly in the upper part of the frame).

FIGS. 14 to 18 thus illustrate an example of this fourth embodiment implementing, just as in the second embodiment, a link by one or two leaf springs known as synchronization leaves or metal foil(s). The principle of transmission of motion from the lower shuttle towards the upper shuttle through this leaf spring or springs is identical to the technique described in the second embodiment of the description and shall not be described in greater detail here.

The handle for unlocking and actuating the mobile panel 1443 then has two portions (or grasping elements) 1451, 1452 which can be brought close to each other by clamping between the thumb and the forefinger.

The two grasping elements 1451, 1452 are mounted in a housing made in the low part 1447 of the frame of the mobile panel 1443 and are mobile relatively to this frame, parallel to the axis of movement of the mobile panel 1443, thus enabling its unlocking and its sliding along the guide rails 1421, 1422.

The mobile panel 1443 thus makes it possible to completely close off the aperture made in the fixed unit 1441 (as illustrated in FIG. 4) and is designed to slide and partially or totally release this aperture. In the closing-off position of the mobile panel 1443 shown in FIG. 14, the two grasping elements 1451, 1452 are relaxed.

Figure 15:
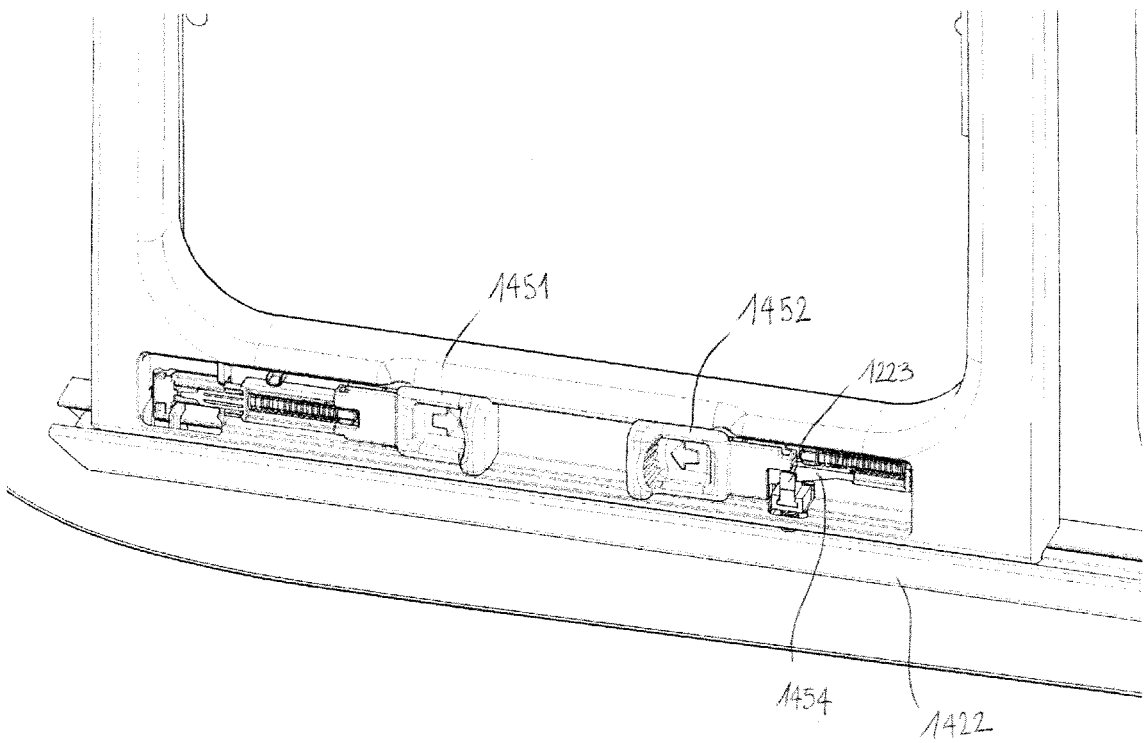
FIGS. 15 to 17 are detailed views of the lower part of the frame of the mobile panel and of the lower guiding rail of the embodiment shown in FIG. 14.
Figure 16:
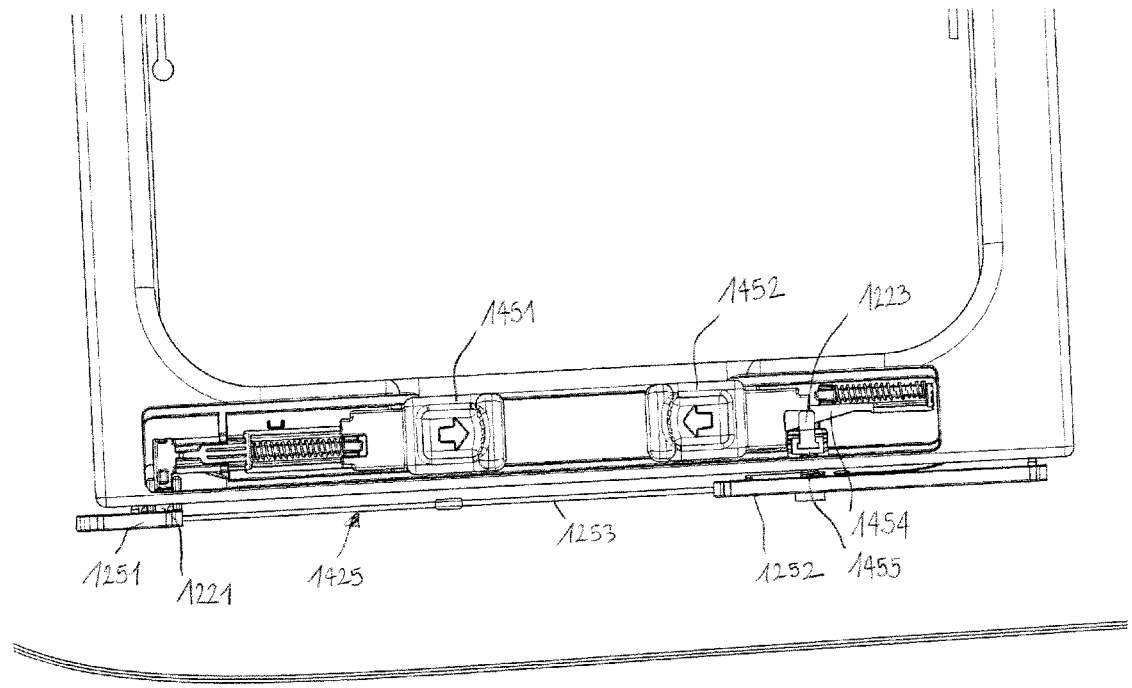

FIGS. 15 and 16 are detailed views of the lower part 1447 of the frames of the mobile panel 1443 and of the lower guide rail 1422, the mobile panel 1443 being in closing-off position and the two grasping elements (1451, 1452) being relaxed.

Figure 14:
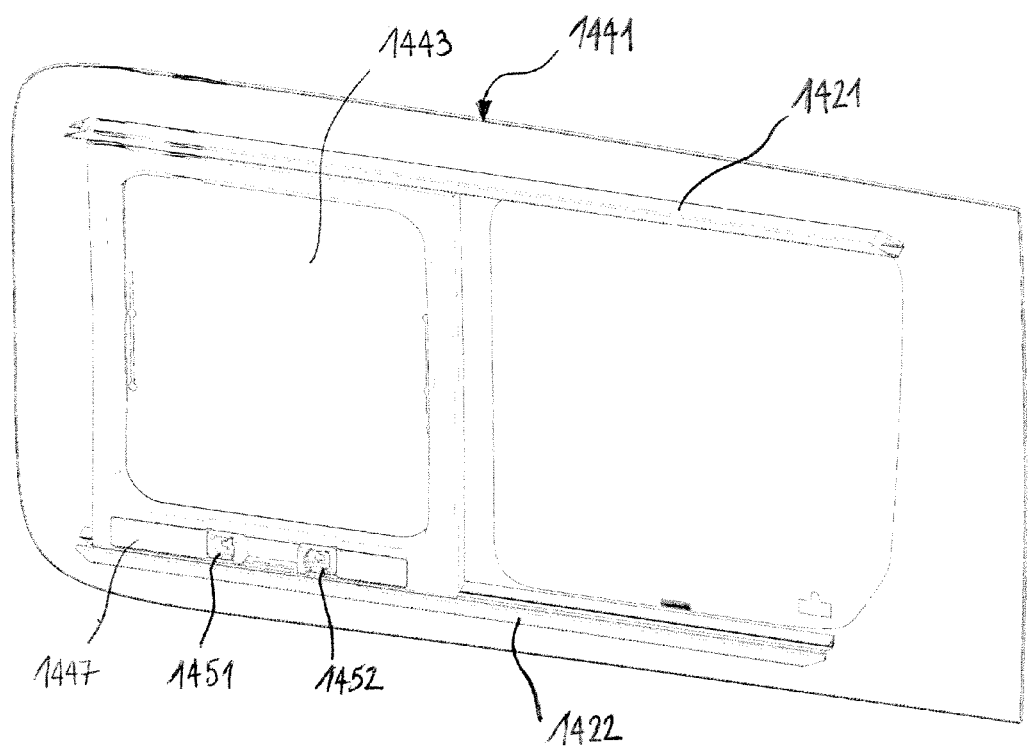
FIG. 14 illustrates a fourth embodiment of the invention implementing a handle comprising two grasping elements that can be brought closer to each other.

The two grasping elements 1451, 1452 are each connected to a guiding peg, only the peg 1221 connected to the grasping element 1451 being represented in this FIG. 14 and the following figures to facilitate the reading. A locking bolt 1223, under the effect of the spring 1455, leans on the inclined surface of an element 1454 connected to the grasping element 1452 and can be moved perpendicularly to the guide rail 1422 by means of the grasping element 1452. In FIGS. 15 and 16, this bolt 1223 is in the low position and thus locks the mobile panel 1443 in the closing-off position.

Figure 18:
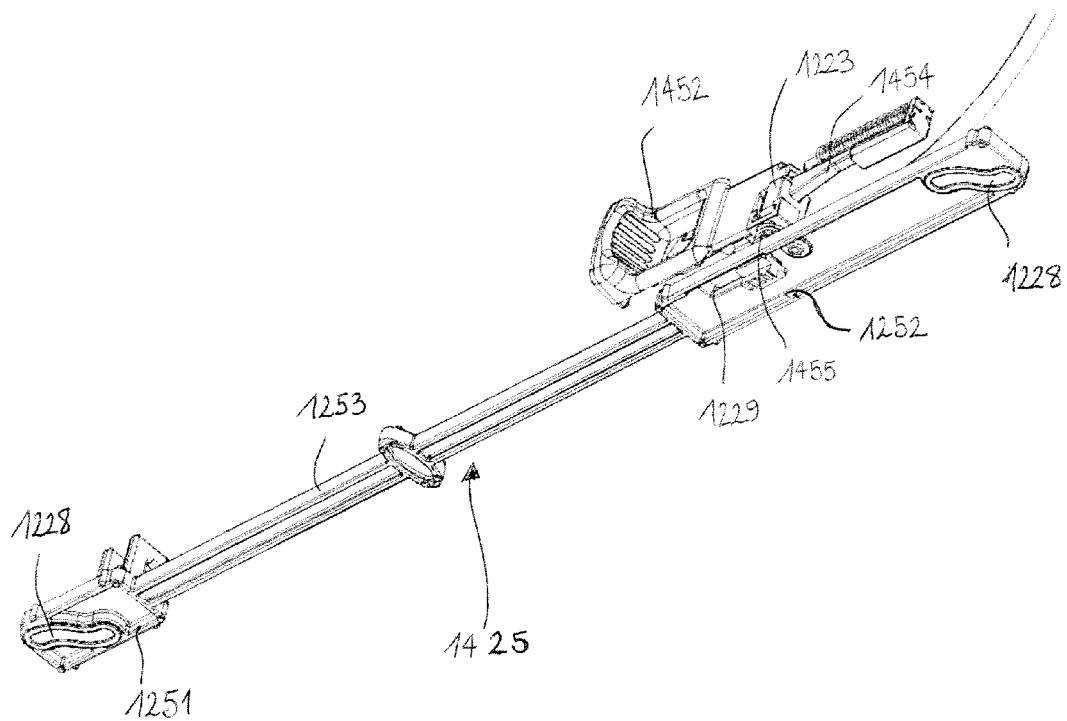
FIG. 18 is a view in perspective of the shuttle-forming slide and of a grasping element of the embodiment shown in FIG. 14.

A shuttle-forming slide 1425 facing the position of the sliding panel 1443 is housed in the internal slideway of the rail 1422, substantially aligned with the sliding panel, and can slide in the slideway of the rail 1422. It has two guiding pads 1251 and 1252, rigidly linked by a connection bar 1253 as illustrated in FIG. 18.

A guiding groove 1228 or a swaying track is formed in each of the pads 1251, 1252 to receive the base of each guiding peg. These guiding grooves 1228, in this embodiment, each represent a portion inclined by an angle equal to 45° relatively to the direction of the internal slideway of the rail 1442. Other groove shapes are be envisaged, such as a curved shape.

A groove 1229 designed to receive the bolt 1223 is formed in the guiding pad 1252.

Figure 17:
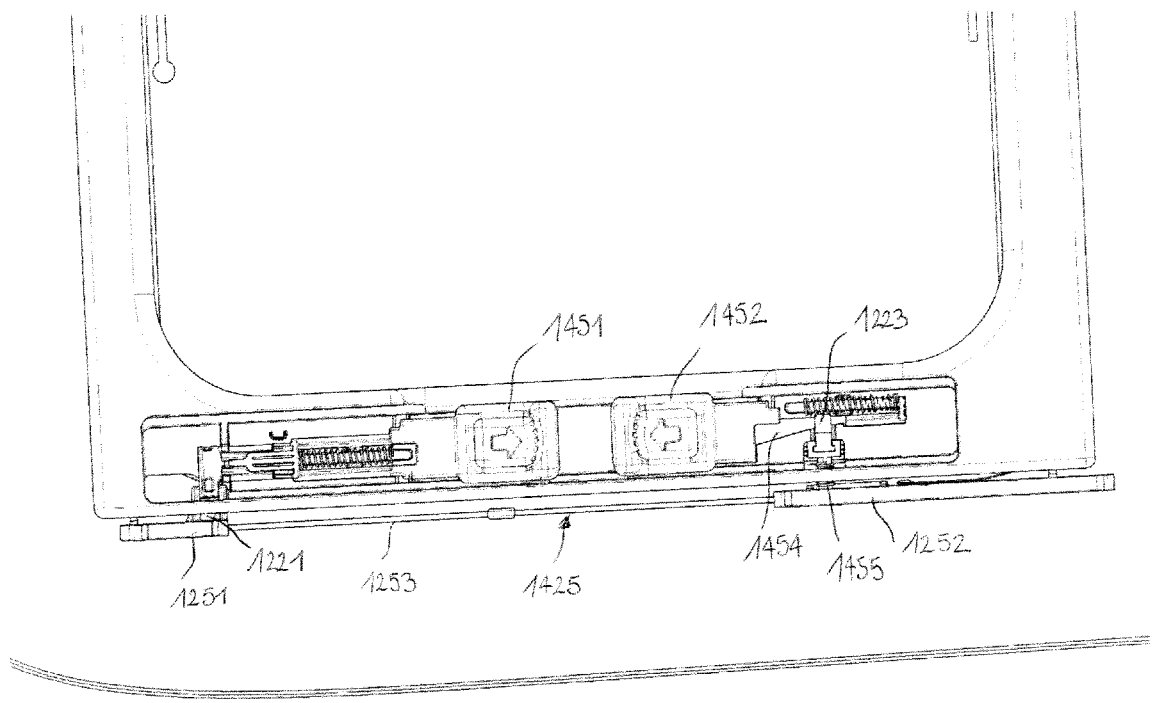

When the two grasping elements 1451, 1452 are brought closer to each other by clamping between the thumb and the index finger, as shown in FIG. 17, the element 1454 is moved towards the grasping element 1452, in this case leftwards and the bolt 1223, because it leans against the inclined surface of the element 1454 and by the action of the spring 1455, is moved upwards, thus unlocking the mobile panel 1443. The guiding pegs are moved rightwards by means of the slide or shuttle 1425 as illustrated in FIG. 17, the slide or shuttle 1425 being then capable of moving in the guiding rail 1422 provided that the two grasping elements 1451, 1452 are kept close together. Thus, in bringing the two grasping elements 1451, 1452 together, the mobile panel 1443 can be moved to a cleared position and then into different opening positions along the fixed frame.

There is then a highly ergonomic mechanism, where the user, in one and the same motion (a movement along the sliding axis) can obtain the unlocking and then the sliding of the mobile panel (unlike in the case where a handle with two elements capable of being brought together is mounted vertically).

Should the grasping element 1452 be released, then, by the force of a return spring, it is brought rightwards and therefore the element 1454 is moved in the same direction, as it happens rightwards. The bolt 1223, because it is leaning against the inclined surface of the element 1454, is moved downwards, thus locking the mobile panel 1443. Consequently, it is possible to lock the mobile panel in different opening positions in releasing the grasping element 1452.

As indicated here above, a handle of this kind formed by two grasping elements 1451, 1452 is particularly ergonomic and, in one and the same motion, makes it possible to unlock and move the mobile panel also when it is in an open position.

As stressed above, means for synchronizing which transmit an actuation, transmitted to the lower shuttle 1425, to the other shuttle situated in the upper guide rail are provided between the lower shuttle and the upper shuttle.

In variants of implementation of this fourth embodiment, it can be planned to have other handles mounted at the bottom and/or top part of the frame of the mobile panel.

8. Fifth Embodiment

FIGS. 19 and 20 give a partial illustration (only one lower shuttle 1504A being visible) of an example of a fifth embodiment implementing a connection by one or two synchronization rack cables 1574 (or in one variant by one or two metal foils) circulating in the frame 1562 of the mobile panel 1543. In FIG. 20, a protection hood 1550 is represented transparently so as to reveal the functional elements that it covers. In practical terms, this hood 1550 will generally opaque. It is not shown in FIG. 19 in order to make it easier to understand the mechanism.

The principle of the transmission of motion from the lower shuttle or shuttles to the upper shuttle or shuttles through this cable or cables is identical to the technique described in the second embodiment of the description.

However, in this fifth embodiment, the means for synchronizing furthermore comprise an intermediate element in the form of a swaying shaft or pin 1560 which links the shuttles and the synchronization cable or cables 1574. The shaft 1560 is fixed by a first end to the cable 1574, its other end being free to move in a groove or an aperture 1561 of the shuttle 1504A.

The synchronization cable 1574 is associated with a handle 1501 which, in this example, is a rotating handle called a quarter-turn handle situated on a lower edge of the frame 1562 of the mobile panel 1543 to which an actuating gear 1575 is fixed.

Since the mobile panel is closed (as shown in FIGS. 19 and 20), a quarter-turn leftward rotation of the handle 1501 draws the cable 1574 and then leads to the unlocking of the mobile panel and the swaying of the mobile panel 1543. During this swaying, the free end of the control shaft 1560 for controlling the swaying moves perpendicularly to the lower guide rail 1522 in the groove or a window 1561 of the shuttle 1504A. The aperture 1561 made in the frame 1562 of the mobile panel enables the moving of the end of the shaft 1560 which is fixed to the synchronization cable 1574 during the swaying.

The user can thereupon move the mobile panel in a sliding motion leftward, thus prompting the movement of the shuttle 1504A in the lower guide rail 1522 but also the movement of the other lower and upper shuttles which are each connected to the synchronization cable 1574 by means of a swaying shaft.

In other words, the handle 1501 directly actuates the cable (and indirectly actuates the lower shuttle or shuttles), the cable 1574 synchronizing the motion of the lower and upper shuttles by means of the swaying shaft 1560.

The maneuvering of the opening during closure can however, in certain modes of implementation, be relatively difficult. In one particular embodiment, to help with this closure and make it easier for the user, it is possible for the window 1561 in which the swaying shaft 1560 is positioned to be not perpendicular to the plane of the opening but inclined relatively to this plane, for example substantially diagonal relatively to the longitudinal edges of the shuttle 1504A (it has a sloping shape or an inclined facet shape), and to assist in and accompany the swaying of the mobile panel 1543 when the user wishes to bring it back to the closed position.

It is also possible, in the lower and/or upper rails 1522 to provide for a swaying stop 1576 associated with each shuttle.

9. Variants

The embodiments described here above apply to an automobile vehicle.

However, it is clear that an embodiment of the invention can be applied in the same way to other structures having a wall in which an opening is defined, for example a caravan or a camping car.

In one variant, the frame may carry a first handle for unlocking said sliding panel and a second handle for moving said sliding panel.

An exemplary embodiment of the invention proposes a technique to improve the sliding movement of the mobile panel of a device for closing off a structure, especially of a motorized vehicle, or flush opening, especially by preventing arching of the mobile panel and/or jamming of the panel.

An embodiment of the invention provides a device of this kind for closing off an opening that is simple to mount on a door, a wall or a roof of a vehicle, and that enables easy and reliable use.

An embodiment of the invention provides a device for closing off of this kind, for which the mechanism for actuating the opening/closing and/or the sliding motion is simple and reliable.

In particular, an embodiment of the invention provides a such device for closing off that works efficiently despite possibly great clearance values.

An embodiment of the invention provides a device for closing off an opening that preserves all the advantages of "flush openings" already developed by the holder of the present application, and especially their:

flush aesthetic aspect;
aerodynamic aspect;
facility and reduced manufacturing cost;
facility and reduced cost of assembly.

Although the present disclosure has been described with reference to one or more examples, workers skilled in the art will recognize that changes may be made in form and detail without departing from the scope of the disclosure and/or the appended claims.

The invention claimed is:

1. A device for closing off an opening made in a structure having an interior, comprising a fixed panel in which there is defined an aperture, and at least one sliding panel having:
   an upper shuttle and a lower shuttle, respectively guided in two distinct guide rails mounted or formed on a surface of said fixed panel, wherein the shuttles are disposed toward the interior of said structure;
   a frame bearing at least two guiding pegs respectively engaging with each one of said shuttles, these shuttles comprising guides for guiding said pegs enabling a transverse movement of said frame relative to said shuttles;
   means for actuating acting directly or indirectly on said shuttles in order to move the latter in said rails, causing said sliding panel to move in a direction perpendicular to a plane of said fixed panel; and
   means for synchronizing the movement of said shuttles, said means for synchronizing comprising at least one leaf spring or at least one cable circulating in a part of the frame of the sliding panel, and wherein said means for synchronizing is connected to the lower shuttle and to the upper shuttle.

2. The device for closing off according to claim 1, said means for synchronizing comprising at least one intermediate linking element which links one of said shuttles and one synchronizing element.

3. The device for closing off according to claim 2, wherein said means for synchronizing comprise two intermediate linking elements, each of said elements linking one of said shuttles and said synchronizing element.

4. The device for closing off according to claim 1, wherein said means for actuating comprise a linking portion linking said shuttles and extending between said rails perpendicularly to the axis of movement of said shuttles, and wherein at least one part of said means for synchronizing is carried by and/or housed in said linking portion.

5. The device for closing off according to claim 4, wherein said means for synchronizing comprise at least one synchronizing element circulating in said linking part, between at least two guiding elements provided for this purpose on said linking portion.

6. The device for closing off according to claim 5, wherein said means for synchronizing comprise two synchronizing elements that cross each other in said linking part and are extended in and/or along said rails.

7. The device for closing off according to claim 5, wherein said guiding elements comprise pulleys, fixed rollers or transfer gear elements.

8. The device for closing off according to claim 1, further comprising means for blocking said sliding panel in every position between a completely open position and a completely closed position, acting on said means for synchronizing.

9. The device for closing off according to claim 8 wherein:
   said means for synchronizing comprise at least one synchronizing element circulating in a linking part, between at least two guiding elements provided for guiding on a linking portion; and
   said blocking means act on at least one of said means for actuating and/or on at least one element carried by one of said means for actuating and/or at least one of said guiding elements.

10. The device for closing off according to claim 9, wherein said frame carries at least one handle for unlocking and/or moving said sliding panel, capable of taking a default locked position and an unlocked position and said handle controls said blocking means.

11. The device for closing off according to claim 1, wherein said means for actuating provide for direct actuation on a first of said shuttles, and said means for synchronizing provide for a transmission of a synchronized actuation to the second of said shuttles.

12. The device for closing off according to claim 11, wherein said means for actuating comprise at least one unlocking and moving handle placed on a portion of the frame of the sliding panel parallel to at least one of said guide rails.

13. The device for closing off according to claim 12, wherein said handle comprises two grasping elements which can take a default locked position and an unlocked position when they are made to approach each other.

14. The device for closing off according to claim 1, wherein said means for synchronizing comprise at least one leaf spring is connected on the one hand to a handle- and on the other hand to one of said shuttles.

15. The device for closing off according to claim 14, wherein said means for synchronizing comprise a leaf spring, each end of which is connected to one of said shuttles, said handle acting on or in the vicinity of the central portion of said spring blade.

16. The device for closing off according to claim 15, wherein said handle conveys a movement to said leaf spring that is substantially parallel to the axis of sliding of the sliding panel.

17. The device for closing off according to claim 1, wherein said intermediate linking element comprises a shaft.

18. The device for closing off according to claim 1, wherein said means for actuating comprise at least one of an electrical or pneumatic drive.

* * * * *